US012282269B2

(12) United States Patent
Kototani et al.

(10) Patent No.: US 12,282,269 B2
(45) Date of Patent: Apr. 22, 2025

(54) CARTRIDGE AND IMAGE FORMING APPARATUS

(71) Applicant: CANON KABUSHIKI KAISHA, Tokyo (JP)

(72) Inventors: Shohei Kototani, Shizuoka (JP); Masatake Tanaka, Kanagawa (JP); Yosuke Sugitani, Kanagawa (JP); Daisuke Baba, Shizuoka (JP); Takashi Hiramatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/354,776

(22) Filed: Jul. 19, 2023

(65) Prior Publication Data

US 2024/0036493 A1 Feb. 1, 2024

(30) Foreign Application Priority Data

Jul. 28, 2022 (JP) ................................ 2022-120557

(51) Int. Cl.
*G03G 15/08* (2006.01)
*G03G 9/08* (2006.01)
(Continued)

(52) U.S. Cl.
CPC ....... *G03G 15/0808* (2013.01); *G03G 9/0804* (2013.01); *G03G 9/0817* (2013.01);
(Continued)

(58) Field of Classification Search
CPC ........... G03G 15/0216; G03G 15/0233; G03G 15/065; G03G 15/0808; G03G 15/0812;
(Continued)

(56) References Cited

U.S. PATENT DOCUMENTS 7,833,865 B2 11/2010 Suzuki
8,377,616 B2 2/2013 Tani
(Continued)

FOREIGN PATENT DOCUMENTS

JP 2007-241243 A 9/2007
JP 2010-39291 A 2/2010
(Continued)

OTHER PUBLICATIONS

U.S. Appl. No. 18/350,248, Yoshiaki Shiotari, filed Jul. 11, 2023.
(Continued)

*Primary Examiner* — Sophia S Chen
(74) *Attorney, Agent, or Firm* — VENABLE LLP

(57) ABSTRACT

A cartridge provides comprising: a toner, a developing roller, a supply member and a regular member. The supply member abuts the surface of the developing roller and the regulating member serves to regulate the toner carried on the surface of the developing roller. The cartridge includes a first supply electrode to which a voltage is supplied from outside of the cartridge, with the supply member and the regulating member electrically connected to the same first supply electrode. Additionally, the toner contains a compound A having a structure represented by Formula (1) below, $$-(CH_2CH_2O)- \quad (1)$$

where, when compound A is eluted in methanol a supernatant containing compound A is analyzed by liquid chromatograph ESI/MS, a specific peak of which an average m/z is 300 to 1000 exists.

17 Claims, 11 Drawing Sheets

(51) Int. Cl.
*G03G 15/00* (2006.01)
*G03G 21/00* (2006.01)

(52) U.S. Cl.
CPC ..... *G03G 15/0812* (2013.01); *G03G 15/0868* (2013.01); *G03G 15/5004* (2013.01); *G03G 21/0011* (2013.01); *G03G 2215/0643* (2013.01)

(58) Field of Classification Search
CPC ........... G03G 15/0867; G03G 15/0868; G03G 15/5004; G03G 21/0011; G03G 21/0064; G03G 21/1652; G03G 21/1814; G03G 2215/0643; G03G 9/0804; G03G 9/0806; G03G 9/0817; G03G 9/09741; G03G 9/0975
See application file for complete search history.

(56) References Cited

U.S. PATENT DOCUMENTS

| | | | | |
|---|---|---|---|---|
| 8,628,899 | B2 | 1/2014 | Kawamura | |
| 8,815,484 | B2 | 8/2014 | Tanaka | |
| 9,158,216 | B2 | 10/2015 | Shimano | |
| 9,377,705 | B2 | 6/2016 | Shimano | |
| 9,383,668 | B2 | 7/2016 | Noji | |
| 9,500,972 | B2 | 11/2016 | Tanaka | |
| 9,575,424 | B2 | 2/2017 | Nakagawa | |
| 9,599,919 | B2 | 3/2017 | Isono | |
| 9,658,549 | B2 | 5/2017 | Tanaka | |
| 9,785,071 | B2 | 10/2017 | Shimano | |
| 9,829,816 | B2 | 11/2017 | Tanaka | |
| 9,835,964 | B2 | 12/2017 | Yoshida | |
| 9,904,193 | B2 | 2/2018 | Nakagawa | |
| 9,958,801 | B2 | 5/2018 | Tanaka | |
| 10,054,866 | B2 | 8/2018 | Tanaka | |
| 10,678,155 | B2 | 6/2020 | Terui | |
| 10,747,133 | B2 | 8/2020 | Yagi | |
| 10,845,721 | B2 | 11/2020 | Tanaka | |
| 10,942,465 | B2 | 3/2021 | Kototani | |
| 10,942,466 | B2 | 3/2021 | Tominaga | |
| 10,976,678 | B2 | 4/2021 | Yamawaki | |
| 10,976,679 | B2 | 4/2021 | Tanaka | |
| 11,003,104 | B2 | 5/2021 | Katsura | |
| 11,003,105 | B2 | 5/2021 | Sato | |
| 11,169,460 | B2 | 11/2021 | Kototani | |
| 11,249,408 | B2 | 2/2022 | Tsuda | |
| 2007/0098459 | A1 * | 5/2007 | Endo | G03G 15/065 399/281 |
| 2007/0190444 | A1 | 8/2007 | Kotsugai | |
| 2013/0078563 | A1 | 3/2013 | Nakayama | |
| 2014/0080047 | A1 | 3/2014 | Takahashi | |
| 2016/0179021 | A1 | 6/2016 | Mizuhata | |
| 2016/0306292 | A1 | 10/2016 | Tauchi | |
| 2017/0371255 | A1 | 12/2017 | Shimizu | |
| 2021/0223731 | A1 | 7/2021 | Suzuki | |
| 2021/0373450 | A1 | 12/2021 | Kawaguchi | |
| 2022/0128918 | A1 | 4/2022 | Kototani | |
| 2022/0214630 | A1 | 7/2022 | Kamikura | |
| 2022/0413407 | A1 | 12/2022 | Inoue | |
| 2023/0042289 | A1 | 2/2023 | Tanaka | |
| 2023/0273539 | A1 | 8/2023 | Katsura | |
| 2023/0273543 | A1 | 8/2023 | Tanaka | |

FOREIGN PATENT DOCUMENTS

| | | | |
|---|---|---|---|
| JP | 2012-98503 | A | 5/2012 |
| JP | 2014-167602 | A | 9/2014 |
| JP | 2016-126340 | A | 7/2016 |

OTHER PUBLICATIONS

U.S. Appl. No. 18/350,266, Mayumi Inoue, filed Jul. 11, 2023.
U.S. Appl. No. 18/350,331, Shohei Kototani, filed Jul. 11, 2023.
Basic Mass Spectrometry, Shimadzu Excellence in Science, pp. 1-2 https://www.shimadzu.com/an/service-support/faq/gas-chromatograph-mass-spectrometry/mz/index.html.
Interpreting Mass Spectra, Chemistry LibreTexts, pp. 1-5 https://chem.libretexts.org/Courses/Athabasca_University/Chemistry_350%3A_Organic_Chemistry_I/12%3A_Structure_Determination-_Mass_Spectro . . . .
Mass Spectrometer, StatPearls, NCBI Bookshelf, pp. 1-11, https://www.ncbi.nlm.nih.gov/books/NBK589702/.
Mass Spectrometry Terms and Definitions, Research, Weill Cornell Medicine, pp. 1-4 https://research.weill.cornell.edu/core-facilities/advanced-biomolecular-analysis-core-abac/ms-terms-and-definitions.
Mass Spectrometry, pp. 1-9 https://www.2.chemistry.msu.edu/faculty/reusch/virttxtjml/spectrpy/massspec/masspec1.htm.
What is Mass Spectrometry, Broad Institute, pp. 1-2 https://www.broadinstitute.org/technology-areas/what-mass-spectrometry.

* cited by examiner

CARTRIDGE AND IMAGE FORMING APPARATUS

BACKGROUND OF THE INVENTION

Field of the Invention

The present disclosure relates to a cartridge and an image forming apparatus including the cartridge that are used in a recording method using an electrophotographic method, an electrostatic recording method, and a toner jet scheme recording method.

Description of the Related Art

A method for visualizing image information via an electrostatic latent image, such as an electrophotographic method, has been applied to copy machines, multi-function machines, and printers. In recent years, electronic photographs main bodies and toner cartridges have been required to have yet longer lifetimes, smaller sizes, and higher image quality, with an increase in varieties of usage purposes thereof.

Also, controlling at a higher degree the charging performance of a toner is effective for further improvement in image quality. In regard to a toner supply to a developer carrying member, a developer supply member capable of containing a toner in a foamed layer is typically used to supply the toner to the developer carrying member in a case of a single-component non-magnetic toner. A regulating blade abutting the developer carrying member regulates the amount of supplied toner to an appropriate toner amount and imparts an electric charge. At this time, a potential difference may be provided between the developer supply member and the developer carrying member in order to raise a toner supply force. Additionally, a potential difference may be provided between the regulating member and the developer carrying member in order to impart an appropriate electric charge to the toner.

In an ordinary electrophotographic process, the amount of supplied toner and charge application are appropriately controlled, and a charge quantity and charging stability of the toner are improved, by taking advantage of properties of the toner and potential differences of members used for a cartridge.

One of purposes to increase the charge quantity of the toner is to prevent oppositely charged toner from being generated. Since the toner typically has a specific charge quantity distribution in accordance with properties of the toner when the toner is charged through triboelectric charging, a part of a toner with a small charge quantity may be oppositely charged.

In the electrophotographic process, a toner carried on a developing roller, which is a toner carrying member, is developed on a photosensitive drum, which is an electrostatic latent image bearing member, due to a potential difference between the developing roller and the photosensitive drum. At this time, a phenomenon called fogging on the photosensitive drum, in which the oppositely charged toner that is likely to be generated in a toner with a small charge quantity is developed in a non-image region on the photosensitive drum, may occur. If the toner that may cause fogging is printed on a paper, this may cause an image problem in which the toner is printed on a part that is supposed to be kept with no printing thereon, and also, the toner may be unnecessarily consumed, which may be problematic in downsizing and lifetime extension of the cartridge.

Japanese Patent Laid-Open No. 2012-098503 discloses a toner with improved charging uniformity and charging stability throughout lifetime thereof and capable of holding a large charge quantity by using a polyester resin containing the element titanium and a non-ionic surfactant in the toner.

SUMMARY OF THE INVENTION

As described above, a toner having a large charge quantity and a cartridge using the toner have been proposed in order to achieve a long lifetime and high quality image.

On the other hand, examples of a trouble that may be caused due to increase in charge quantity include degradation of developing efficiency. As described above in Description of the Related Art, a toner has a specific charge quantity distribution, and a toner partially having a large charge quantity is thus generated. The toner having a large charge quantity has a high electrostatic adhesion force and may thus remain on the developing roller without being developed onto the photosensitive drum. The remaining toner may cause a regulating failure and cause an image failure called a developing ghost. Therefore, the charge quantity of the toner is preferably small in terms of developing efficiency.

On the other hand, examples of events that are likely to be problematic when a toner with a small charge quantity is used include variations in voltage output originating from a power source of a main body. Since electronic components used in the power source of the main body always include variations, variations always occur in outputs of power source voltages. The variations may lead to imbalance between the amount of supplied toner and the charge application described above and may cause variations in charge quantity of the toner. In a toner with a small charge quantity, in particular, an oppositely charged toner is likely to be generated due to the variations. Therefore, fogging on the photosensitive drum is likely to occur, and it is difficult to deal with this.

From this viewpoint, the toner described in Japanese Patent Laid-Open No. 2012-098503 is adapted on the assumption that the toner is used in a state where the charge quantity of the toner is large, and there is room for further improvement in order to use the toner with a small charge quantity in a case where there are variations in outputs originating from the power source of the main body.

In view of these problems, the present disclosure provides a cartridge capable of curbing generation of an oppositely charged toner irrespective of variations in voltage output of a power source of a main body even if a toner with a small charge quantity is used. Also, the present disclosure provides an image forming apparatus including the cartridge.

The present disclosure relates to a cartridge comprising:

a toner;

a developing roller carrying on a surface thereof the toner;

a developer container rotatably supporting the developing roller;

a toner accommodating portion accommodating the toner;

a supply member abutting the surface of the developing roller and supplying the toner from the toner accommodating portion to the surface of the developing roller; and a regulating member abutting the surface of the developing roller and regulating the toner carried on the surface of the developing roller, wherein

- the cartridge comprises a first supply electrode to which a voltage is supplied from outside of the cartridge,
- the supply member and the regulating member are electrically connected to the same first supply electrode,
- the toner comprises a compound A having a structure represented by Formula (1) below, $$—(CH_2CH_2O)— \quad (1)$$

- the compound A is eluted in methanol when elution treatment of the toner is carried out under an elution condition A below, and
- in a case where a supernatant obtained by centrifuging an eluate of the compound A eluted in the methanol under a centrifugation condition A below is analyzed within a range of m/z=50 to 1500 by liquid chromatograph ESI/MS,
- a reference peak defied as follows is present, and
- an average m/z defined as follows is 300 to 1000:
- Elution condition A: Methanol (a product equivalent to JIS K8891) in an amount of ten times that of the toner by mass is used, and a mixture thereof is stirred at 25° C. at a rotor rotation speed of 200 rpm for 10 hours with a stirring apparatus;
- Centrifugation condition A: Rotation is performed with a rotation radius of 10.1 cm and a rotation speed of 3500 rpm at 25° C. for 30 minutes;
- Reference peak: A relative abundance is obtained on the assumption that an abundance of a peak of the highest strength in a mass analysis spectrum obtained by liquid chromatograph ESI/MS of the supernatant is 100%; peaks are chosen in a descending order of the relative abundance, and a m/z value of a peak top of the chosen peak is defined as P; and a chosen peak with the highest relative abundance is defined as the reference peak from among the chosen peaks including peaks with a relative abundance of not less than 10% and with m/z values of P +44 or P −44 at peak tops;
- Average m/z: The m/z value at the peak top of the reference peak is defined as Ps, the m/z value at the peak top=Ps+44n (n is an integer), and an average value of m/z at peak tops of peaks with a relative abundance of not less than 30% is defined as an average m/z.

According to the present disclosure, it is possible to provide a cartridge capable of curbing generation of an oppositely charged toner irrespective of variations in voltage output of a power source of the cartridge even if a toner having a small charge quantity is used. Further features of the present invention will become apparent from the following description of exemplary embodiments with reference to the attached drawings.

DESCRIPTION OF THE EMBODIMENTS

Figure 1:
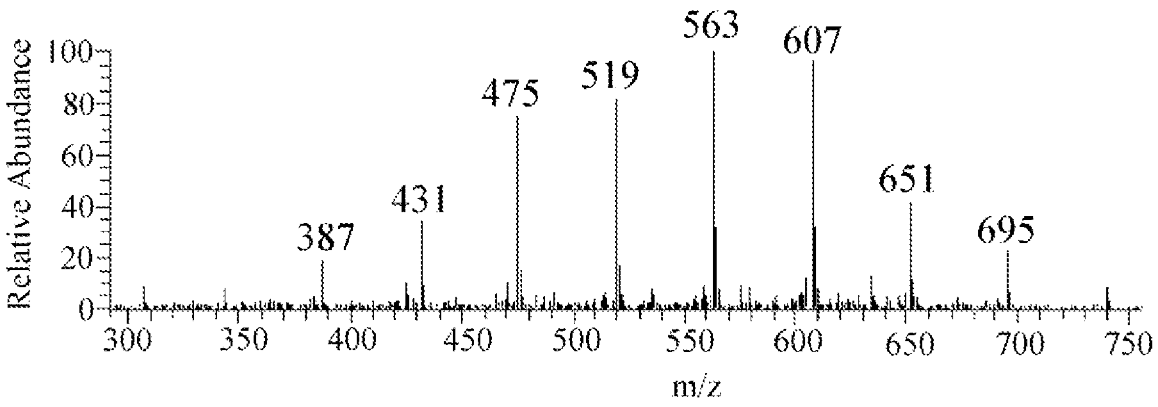
FIG. 1 is an example of a liquid chromatography ESI/MS spectrum.

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably.

As described above, a toner having a small charge quantity is required to have a small and uniform charge quantity. As one of reasons for broad charge quantity distribution of a toner is that electric charge distribution in the vicinity of the surface of the toner is localized and a part having a large charge quantity (hereinafter, referred to as a strongly charged portion) and a part having a small charge quantity (hereinafter, referred to as a weakly charged part) are present.

Even in a toner having a small charge quantity, a strongly charged portion may be present even if the toner has a small charge quantity as a whole, it is thus not possible to reduce an amount of toner with a large charge quantity, and there is no way to avoid the presence of this strongly charged toner. Therefore, it is difficult to sufficiently improve developing efficiency. For this reason, a toner that allows an electric charge to escape from the strongly charged portion and has a narrow charge distribution is needed in order to sufficiently enhance developing efficiency of a toner with a small charge quantity.

Furthermore, an amount of oppositely charged toner is likely to be increased, and fogging and member contamination are likely to occur, in the toner with a small charge quantity due to variations in voltage outputs originating from a power source of a cartridge as described above.

The cartridge includes a developing roller that carries a toner, a supply member that supplies the toner to a surface of the developing roller, and a regulating member that imparts an electric charge to the toner on the developing roller and regulates the amount of carried toner to an appropriate amount. Voltages of various power sources of an image forming apparatus are generated by combining electronic components. Also, since the electronic components always include variations, voltages of the power sources thus always include variations in output. Since the power sources always include such variations in voltage outputs, deviation of about several percents may occur even if a desired voltage is set.

In a case where a voltage to be applied to the supply member is raised due to such variations in outputs of power source voltages, the amount of supplied toner increases. At this time, a total charge quantity Q of the toner at the regulating member does not change. On the other hand, since the amount of supplied toner has increased, Q/M that is a charge quantity per unit mass in consideration of a mass M of the toner decreases.

In other words, the charge quantity that a single particle of the toner has is reduced, and with regard to the charge distribution of the toner, the toner is shifted further to the oppositely charged side. Particularly, as described above, even if the charge distribution in the toner with a small charge quantity is narrowed, the amount of oppositely charged toner is likely to increase due to variation in the voltage output originating from the power source of the main body, which readily causes fogging and member contamination.

In order to overcome this phenomenon, the present inventors conducted intensive studies to curb generation of an oppositely charged toner even if a toner with a small charge quantity is used and there are variations in outputs of voltages to be supplied to the cartridge and contrived the following cartridge.

That is, the present disclosure relates to a cartridge comprising:

a toner;

a developing roller carrying on a surface thereof the toner;

a developer container rotatably supporting the developing roller;

a toner accommodating portion accommodating the toner;

a supply member abutting the surface of the developing roller and supplying the toner from the toner accommodating portion to the surface of the developing roller; and a regulating member abutting the surface of the developing roller and regulating the toner carried on the surface of the developing roller, wherein the cartridge comprises a first supply electrode to which a voltage is supplied from outside of the cartridge, the supply member and the regulating member are electrically connected to the same first supply electrode, the toner comprises a compound A having a structure represented by Formula (1) below, $$—(CH_2CH_2O)— \quad (1)$$

the compound A is eluted in methanol when elution treatment of the toner is carried out under an elution condition A below, and in a case where a supernatant obtained by centrifuging an eluate of the compound A eluted in the methanol under a centrifugation condition A below is analyzed within a range of m/z=50 to 1500 by liquid chromatograph ESI/MS, a reference peak defied as follows is present, and an average m/z defined as follows is 300 to 1000:

Elution condition A: Methanol (a product equivalent to JIS K8891) in an amount of ten times that of the toner by mass is used, and a mixture thereof is stirred at 25° C. at a rotor rotation speed of 200 rpm for 10 hours with a stirring apparatus;

Centrifugation condition A: Rotation is performed with a rotation radius of 10.1 cm and a rotation speed of 3500 rpm at 25° C. for 30 minutes;

Reference peak: A relative abundance is obtained on the assumption that an abundance of a peak of the highest strength in a mass analysis spectrum obtained by liquid chromatograph ESI/MS of the supernatant is 100%; peaks are chosen in a descending order of the relative abundance, and a m/z value of a peak top of the chosen peak is defined as P; and a chosen peak with the highest relative abundance is defined as the reference peak from among the chosen peaks including peaks with a relative abundance of not less than 10% and with m/z values of P +44 or P −44 at peak tops;

Average m/z: The m/z value at the peak top of the reference peak is defined as Ps, the m/z value at the peak top=Ps+44n (n is an integer), and an average value of m/z at peak tops of peaks with a relative abundance of not less than 30% is defined as an average m/z.

Hereinafter, embodiments will be described using drawings.

Also, the following embodiments are not intended to limit the invention of the claims, and all the combinations of features described in the embodiments are not necessarily essential for a solution of the present invention.

First Embodiment

Figure 2:
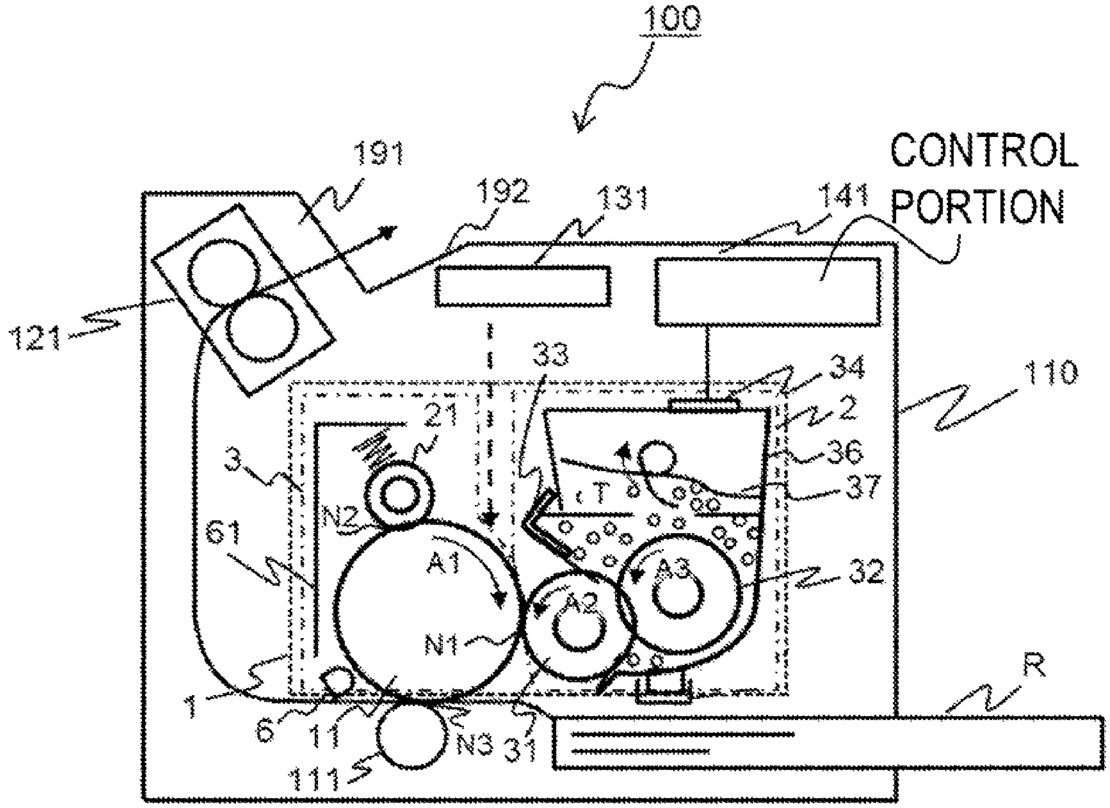
FIG. 2 is an overview configuration sectional diagram at the time of image formation.

FIG. 2 is a diagram illustrating an overview configuration of an image forming apparatus 100 according to a first embodiment. FIG. 2 illustrates an overview configuration diagram at the time of image formation. However, components, dimensions, dispositions, and the like in the embodiments should be appropriately changed and are not intended to limit the scope of the invention.

Overall Configuration and Operations of Image Forming Apparatus

An overall configuration of the image forming apparatus will be described with reference to FIG. 2. FIG. 2 illustrates, in a sectional view, an overview configuration of the image forming apparatus. The image forming apparatus 100 is a laser printer capable of forming a monochrome image (black single-color image) by using an electrophotographic scheme. The image forming apparatus is not limited to a monochrome machine and may be an apparatus capable of forming a color image.

The image forming apparatus 100 comprises a drum-type (cylindrical) photosensitive member (photosensitive drum) 11 capable of rotating as an image bearing member. Once an image forming operation is started, the photosensitive member 11 is driven and rotated in the direction of the arrow A1 in the drawing (clockwise direction) by a driving force transmitted from a driving motor 161 (FIG. 3) serving as a driving source that configures a driving mechanism.

For example, the photosensitive member 11 is an organic photosensitive member including conductive core metal formed of a conductive material such as aluminum, a charge generation layer that is formed on the conductive core metal, and a charge transport layer that is formed on the charge generation layer.

A surface of the rotating photosensitive member 11 is subjected to uniform charging treatment to a predetermined potential of a predetermined polarity (a negative polarity in this embodiment) that is a normal polarity of the toner by a charging roller 21 that is a roller-type charging member serving as a charging mechanism. The surface (outer peripheral surface) of the charging roller 21 is caused to abut the surface (outer peripheral surface) of the photosensitive member 11. For example, the charging roller 21 is an elastic member roller configured by covering a surface of a cylindrical conductive support member with an elastic layer having predetermined electrical resistance.

The charging roller 21 is caused to abut the surface of the photosensitive member 11 with a predetermined pressurizing force by both end portions of the conductive support member in a rotation axis direction being pressurized by a spring. The charging roller 21 is driven and rotated with rotation of the photosensitive member 11. At the charging treatment, a predetermined charging voltage (charging bias) is applied to the charging roller 21 from a charging power source 171 (FIG. 3) serving as a charging voltage application mechanism (charging voltage application portion) at a predetermined timing.

For example, a DC voltage with a negative polarity as a charging voltage is applied to the charging roller 21. The surface of the photosensitive member 11 after being subjected to the uniform charging treatment (non-image portion) gets to have a dark potential with a negative polarity.

The surface of the photosensitive member 11 after being subjected to the charging treatment is scanning-exposed by an exposure device (laser exposure unit) 131 serving as an exposure mechanism (electrostatic image forming mechanism), and an electrostatic latent image (electrostatic image) is formed on the photosensitive member 11. The exposure device 131 scans the surface of the photosensitive member 11 with a laser beam and performs exposure along a main scanning direction (that is substantially parallel with the rotation axis direction of the photosensitive member 11) of the photosensitive member 11 in accordance with image information (image data).

In addition, the exposure device 131 repeats the exposure along the above main scanning direction in accordance with a timing along a sub-scanning direction (that is substantially parallel with a moving direction of the surface of the photosensitive member 11) in accordance with the image information. In this manner, an electrostatic latent image is formed on the photosensitive member 11. An exposed portion (an image portion) that is the exposed surface of the photosensitive member 11 gets to have a bright potential.

The electrostatic latent image formed on the photosensitive member 11 is developed (visualized) by a developing device (developing cartridge) 2 serving as a developing mechanism supplying a toner T as a developer thereto, and a toner image (toner image; developer image) is thereby formed on the photosensitive member 11. For example, a single-component non-magnetic toner is used as the developer accommodated in the developing device 2. Details of the toner will be described later.

The developing device 2 includes a developing roller 31 serving as a developer carrying member (developing member). At the time of development, a surface (outer peripheral surface) of the developing roller 31 is caused to abut the surface (outer peripheral surface) of the photosensitive member 11. Also, at the time of development, a predetermined developing voltage (developing bias) is applied from a developing power source 172 (FIG. 3) serving as a developing voltage application mechanism (developing voltage application portion) to the developing roller 31 at a predetermined timing.

For example, a DC voltage with a negative polarity as a developing voltage is applied to the developing roller 31. In addition, a toner charged to have the same polarity (for example, the negative polarity) as the charge polarity of the photosensitive member 11 adheres to the exposed portion (image portion) on the photosensitive member 11 with an absolute value of the potential dropped due to the exposure after the uniform charging treatment (reversal development scheme).

In other words, the normal charge polarity of the toner which is a main charge polarity of the toner at the time of development is a negative polarity, for example. Since development is carried out by using a potential difference (development contrast) formed between the developing voltage applied to the developing roller 31 and the bright potential on the photosensitive member 11, a predetermined developing voltage is applied to the developing roller 31. The magnitude of the surface potential formed on the surface of the developing roller 31 and the magnitude of the developing voltage applied to the developing roller 31 are assumed to be substantially the same. The developing roller 31 rotates in the direction of the arrow A2 in the drawing (counterclockwise direction) (the moving direction at the contact portion is a forward direction) which is a direction opposite to that of the photosensitive member 11.

Additionally, a speed difference (the moving speed of the surface of the developing roller 31 is higher) is provided between the moving speed of the surface of the developing roller 31 and the moving speed of the surface of the photosensitive member 11, for example. The developing device 2 will be further described in detail. Here, the moving speed of the surface of each member may be stated as a rotation speed of each member instead.

A transfer roller 111 that is a roller-type transfer member serving as a transfer mechanism is disposed to face the photosensitive member 11. The transfer roller 111 is pressurized toward the photosensitive member 11 and forms a transfer portion (transfer nip) N3 that is a contact portion between the photosensitive member 11 and the transfer roller 111. A toner image formed on the photosensitive member 11 is transferred onto a recording material R that is transported while being sandwiched between the photosensitive member 11 and the transfer roller 111 at the transfer portion N3 due to an action of the transfer roller 111.

At the time of the transferring, a predetermined transfer voltage (transfer bias) is applied from a transfer power source 174 (FIG. 3) serving as a transfer voltage application mechanism (transfer voltage application portion) to the transfer roller 111 at a predetermined timing. For example, a DC voltage with a positive polarity that is a polarity opposite to the normal charge polarity of the toner is applied as a transfer voltage to the transfer roller 111.

The sheet-shaped recording material (a transfer material, a recording medium, or a sheet) R such as a paper is supplied from a sheet feeding portion (feeding portion) to the transfer portion N3. The sheet feeding portion includes, for example, a cassette serving as a recording material accommodating portion, a transport roller serving as a transport member, and the like. The recording material R is accommodated in the cassette and is transported to the transfer portion N3 by the transport roller and the like matching a timing with the toner image on the photosensitive member 11.

The present disclosure provides a cleanerless configuration as will be described later, the toner remaining on the surface of the photosensitive drum 11 is collected by the developing roller 31 after the toner developed on the surface of the photosensitive drum 11 is transferred to the outside. In addition, in a case where the photosensitive drum 11 is caused to rotate outside the image forming apparatus, a region of the photosensitive drum 11 where a developing portion N1 is formed does not come into contact with the contact member when the region of the photosensitive drum 11 moves to the charging portion N2. The contact member is a cleaning member adapted to clean the surface of the photosensitive drum 11.

The recording material R with the toner image transferred thereto is transported to a fixing device 121 serving as a fixing mechanism. The fixing device 121 applies heat and a pressure to the recording material R that bears the unfixed toner image and cause the toner image to be fixed (melt and stick to) the recording material R. The recording material R with the toner image fixed thereon is discharged (output) from a sheet discharge portion (discharge portion) 191 and is then placed on a tray 192 provided above the apparatus main body 110 of the image forming apparatus 100 (here, also simply referred to as an "apparatus main body")

The configuration in the present embodiment is a so-called cleanerless configuration. Due to the cleanerless configuration, a cleaning member abutting the photosensitive member 11 is not present. The toner (remaining toner after transfer) remaining on the photosensitive member 11 without being transferred onto the recording material R by the transfer portion N3 is accommodated inside the developing device 2 by the developing roller 31 attached to the developing device 2 instead of being accommodated inside a toner accommodating portion (waste toner accommodating portion) that is different from that of the developing device 2.

Figure 11:
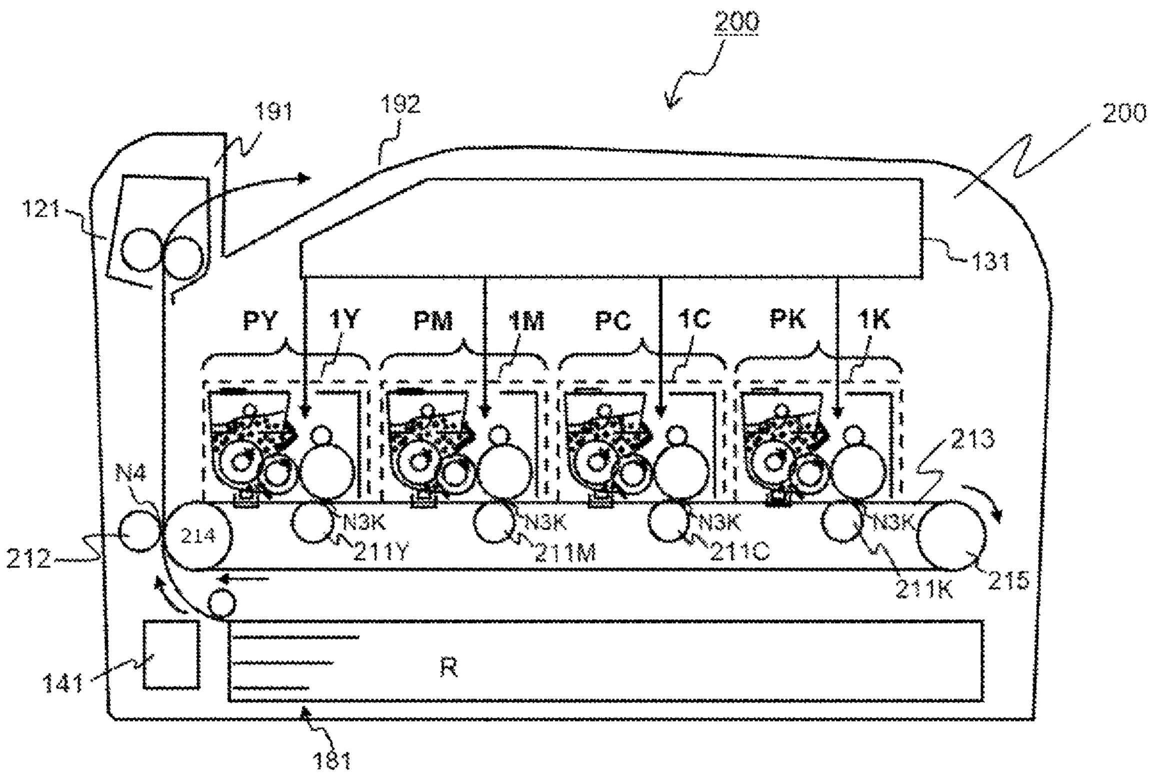
FIG. 11 is an overview sectional diagram of the image forming apparatus.
Figure 13:
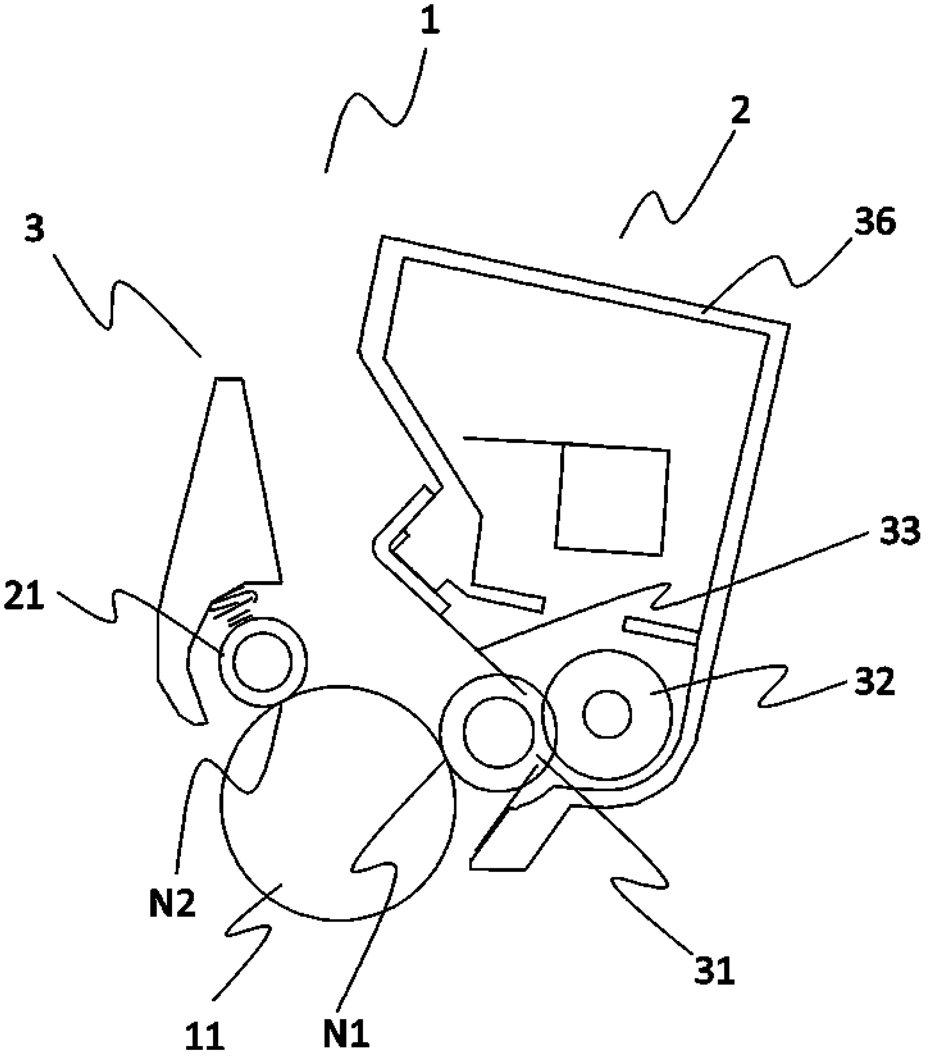
FIG. 13 is a detailed sectional diagram of a process cartridge.

As illustrated in FIG. 2 which is a sectional view of the image forming apparatus 100 comprising a process cartridge 1, FIG. 11 which will be described later, and FIG. 13 illustrating details of the process cartridge, members disposed to be able to come into contact with an image formation region on the photosensitive member 11 are only the charging roller 21 and the developing roller 31 in the process cartridge 1. In other words, the surface of the photosensitive member 11 that has passed through a charging portion N2 which is a contact portion between the photosensitive member 11 and the charging roller 21 passes through the developing portion N1 which is a contact portion between the photosensitive member 11 and the developing roller 31 without coming into contact with anything.

In other words, if the photosensitive member 11 is caused to rotate in a state of the process cartridge 1 outside the image forming apparatus 100, then the surface of the photosensitive member 11 after passing through the developing portion N1 passes through the charging portion N2 without particularly coming into contact with anything.

Subsequently, a process in which the developing roller 31 collects the remaining toner after transfer will be described. A toner having an electric charge charged with an opposite polarity (positively charged) or an electric charge with a small absolute value (a charge quantity that is close to zero) in the toner forming the toner image mainly becomes the remaining toner after transfer.

Here, the toner corresponding to the most part of the toner image is charged with a negative polarity which is a normal polarity. The absolute value of the surface potential formed on the photosensitive member 11 is reduced by a pre-exposure mechanism 6 irradiating the photosensitive member 11 where the remaining toner after transfer is present with light. The photosensitive member 11 is charged to have a dark potential through electrical discharge caused by a potential difference between the potential formed on the surface of the photosensitive member 11 and the charging voltage applied to the charging roller 21. At this time, the photosensitive member 11 is charged, and the remaining toner after transfer is also charged with a negative polarity at the same time.

Once the remaining toner after transfer is charged with a negative polarity, the remaining toner after transfer passes through the abutting portion N2 while remaining on the photosensitive member 11 at the abutting portion N2 between the photosensitive member 11 and the charging roller 21 due to the potential relationship. Thereafter, the remaining toner after transfer charged with the normal polarity adheres to the developing roller 31 due to the potential relationship (back-contrast) between the developing roller 31 and the dark portion at the abutting portion between the photosensitive member 11 and the developing roller 31 which is the developing portion N1, and is the collected by the developing device 2.

In the cleanerless configuration as in the present embodiment, it is essential to minimize the remaining toner after transfer at the transfer portion N3. To do so, it is important for the electric charge of the developed toner to fall within an appropriate range, that is, the toner forming the toner image on the photosensitive member 11 is required to include a small amount of toner with an electric charge with an opposite polarity (positively charged) or toner with an electric charge that is close to zero.

Note that in the present embodiment, the photosensitive member 11, the charging roller 21 serving as a process mechanism acting on the photosensitive member 11, and the developing device 2 configure the process cartridge 1 that can be integrally attached to and detached from the apparatus main body 110. Also, the transfer roller 111, the exposure device 131, the fixing device 121, the pre-exposure mechanism 6, a control portion 141, various power sources, and the like are attached to the apparatus main body 110.

Process Cartridge

Next, the process cartridge 1 will be further described.

The process cartridge 1 is configured to comprise the developing device (a developing cartridge that is a developing unit) 2 and a photosensitive member unit 3. The developing device 2 comprises the developing roller 31, a supply roller 32, a developing blade 33, and a developer container 36 as will be described later in detail. The developer container 36 also functions as a developing frame that supports the developing roller 31, the supply roller 32, and the developing blade 33. The photosensitive member unit 3 includes and supports each of the photosensitive member (photosensitive drum) 11 that is an image bearing member and the charging roller 21 that is a charging member for charging the surface of the photosensitive drum.

Also, the developing device 2 and the photosensitive member unit 3 are coupled to each other such that the developing device 2 can swing with respect to the photosensitive member unit 3 around a rotation axis that is substantially parallel with the rotation axis direction of the photosensitive member 11. More specifically, the process cartridge 1 is integrated by the developer container (developing frame body) 36 of the developing device 2 and a photosensitive member support container (photosensitive member unit frame body) 61 of the photosensitive member unit 3 being slidably coupled to each other.

In this manner, the developing device 2 can move to an abutting position at which the developing roller 31 abuts the photosensitive member 11 and a separated position at which the developing roller 31 is separated from the photosensitive member 11. Unnecessary consumption of the developing device 2 and the photosensitive member 11 is curbed by positioning it at the abutting position and the separated position. In other words, rotation of the developing roller 31 and the supply roller 32 is stopped and consumption of the toner is curbed by stopping the driving of the developing device at the separated position, and friction of the charge transport layer is curbed by the photosensitive member 11 not coming into contact with the developing roller 31.

In regard to the surface moving speed of the developing roller, the developing roller rotates at a speed of 1.4 times the surface moving speed of the photosensitive member. Development (fogging) of the toner at a non-developing portion (white base portion) is curbed by causing the developing roller to rotate more quickly than the photosensitive member (applying a circumferential speed difference).

In addition, a non-volatile memory 34 serving as a storage mechanism is mounted on the process cartridge 1. The non-volatile memory 34 stores information such as lifetime information which is information regarding the lifetime of the process cartridge 1 and toner amount information which is information regarding the amount of toner inside the developing device 2. Here, examples of the lifetime information includes the rotation distance of the photosensitive member 1, the rotation distance of the developing roller 31, and the number of printed recording material R. The non-volatile memory 34 is connected to the control portion 141 provided in the apparatus main body 110 when the process cartridge 1 is attached to the apparatus main body 110.

The control portion 141 performs reading of the information stored in the non-volatile memory 34 and writing of information in the non-volatile memory 34. In this manner, it is possible to provide appropriate information to the control portion 141 when the power source of the image forming apparatus 100 is turned off and when two or more image forming apparatuses 100 use a single process cartridge 1.

Developing Device (Developing Cartridge)

Next, the developing device (developing cartridge) 2 will be further described. The developing device 2 may be a developing cartridge.

The developing device 2 comprises the developing roller 31 that serves as a developer carrying member (developing member) that carries and transports the toner as a developer, supplies the toner to the electrostatic latent image formed on the surface of the photosensitive member 11, and develops the electrostatic latent image. Also, the developing device 2 comprises the supply roller (supply peeling roller) 32 that serves as a developer supply member (developer supply peeling member) that abuts the surface of the developing roller, supplies the toner to the developing roller 31, and peels off the toner from the developing roller 31.

In addition, the developing device 2 comprises the developing blade 33 that serves as a regulating member (regulating blade) that abuts the surface of the developing roller 31 and regulates the toner carried on the surface of the developing roller 31 to a predetermined amount of toner. Also, the developing device 2 comprises the developer container 36 that forms a toner accommodating portion 37 therein. A single-component non-magnetic toner, for example, is accommodated as the developer inside the toner accommodating portion 37.

Each of the developing roller 31 and the supply roller 32 is rotatably supported by the developer container 36. The supply roller 32 is disposed such that the surface thereof (outer peripheral surface) comes into contact with the surface (outer peripheral surface) of the developing roller 31. The toner is supplied from the toner accommodating portion 37 to the developing roller 31 by the supply roller 32, and the developing roller 31 carries the toner on the surface thereof.

The amount of toner carried on the surface of the developing roller 31 is regulated by the developing blade 33, and the toner is subjected to triboelectric charging and is then transported to the abutting portion N1 (developing portion) between the photosensitive member 11 and the developing roller 31. Also, the toner remaining on the surface of the developing roller 31 after passing through the abutting portion N1 (developing portion) between the photosensitive member 11 and the developing roller 31 is peeled off from the surface of the developing roller 31 by the supply roller 32 and is then returned to the inside of the toner accommodating portion 37.

A driving force from the driving motor 161 (FIG. 3) adapted to drive the photosensitive member 11 is transmitted to each of the developing roller 31 and the supply roller 32, and the developing roller 31 and the supply roller 32 are driven and rotated. The developing roller 31 is driven and rotated in the direction of the arrow A2 (counterclockwise direction) in the drawing. The rotation direction of the photosensitive member 11 and the rotation direction of the developing roller 31 are opposite directions. In other words, the developing roller 31 is driven and rotated in a direction in which the moving direction of the surface of the photosensitive member 11 and the moving direction of the surface of the developing roller 31 become a forward direction, at a facing portion (abutting portion) between the photosensitive member 11 and the developing roller 31.

Also, the drive motor 162 (FIG. 3) is attached to the apparatus main body 110, transmits the driving to the developing device 2 through a gear and a coupling serving as a driving transmission mechanism, and drives the developing roller 31 and the supply roller 32.

In addition, the supply roller 32 is driven and rotated in the direction of the arrow A3 (counterclockwise direction) in the drawing. The rotation direction of the developing roller 31 and the rotation direction of the supply roller 32 are the same direction. In other words, the supply roller 32 is rotated and driven in a direction in which the moving direction of the surface of the developing roller 31 and the moving direction of the surface of the supply roller 32 are opposite directions at the facing portion (contact portion) between the developing roller 31 and the supply roller 32. The surface moving speed of the supply roller is a speed that is 0.83 times as high as the surface moving speed of the developing roller.

For example, the developing roller 31 is an elastic member roller configured by providing a conductive elastic rubber layer having predetermined volume resistance as an elastic layer in the surroundings of the core metal made of metal. The developing roller 31 includes a base layer and a surface layer. Silicone rubber is used for the base layer, urethane rubber is used for the surface layer, and urethane bead particles are dispersed in the urethane rubber in the surface layer to set desired roughness. Also, the supply roller 32 is a foamed elastic member roller configured by providing a foamed urethane layer adjusted to have predetermined volume resistance as an elastic layer in the surroundings of the core metal made of metal, for example. A foamed cell is open in the surface layer of the foamed urethane layer to promote holding and transporting of the toner.

In addition, the developing blade 33 is configured of a flexible plate-shaped member, for example. For example, the developing blade 33 is configured of an elastic plate formed by using SUS (stainless steel) or the like. The developing blade 33 is disposed such that the longitudinal direction thereof is substantially parallel to the rotation axis direction of the developing roller 31. Also, one end portion (fixed end portion) of the developing blade 33 in a short-side direction is fixed to the developer container 36.

The toner supplied to the developing roller 31 by the supply roller 32 is regulated by the developing blade 33 and forms uniform toner coating on the developing roller 31. The developing blade 33 is disposed such that the plate surface (the side surface extending in the longitudinal direction of the developing blade 33) located near the distal end on the other end portion (free end portion) side in the short-side direction thereof and the surface of the conductive elastic rubber layer of the developing roller 31 rub with each other. Therefore, the toner on the developing roller 31 is subjected to triboelectric charging, and electric charge is applied thereto by the developing blade 33 at the same time with the formation of the toner coating on the developing roller 31.

Also, the image forming apparatus 100 is configured such that potentials (potentials to be applied) of the developing roller 31, the supply roller 32, and the developing blade 33 can be appropriately set. The voltage to be applied to the developing roller 31 is set to such a voltage that contrast with respect to the bright potential and the dark potential described above (developing contrast; back-contrast) becomes appropriate.

Also, the voltage to be applied to the supply roller 32 is set to be such a voltage that the supply of the toner mainly to the developing roller 31 is appropriately performed. In addition, the voltage to be applied to the developing blade 33 is set to be such a voltage that electric charge application mainly to the toner is appropriately performed.

Therefore, each of the voltage to be applied to the supply roller 32 and the voltage to be applied to the developing blade 33 is set to be appropriate with respect to the voltage to be applied to the developing roller 31. For example, the voltage to be applied to the supply roller 32 that is a supply member and the voltage to be applied to the developing blade 33 that is a regulating member are the same and are set such that a potential difference with respect to the voltage to be applied to the developing roller 31 becomes −100 V. Specifically, the voltage to be applied to the developing roller 31 is −325V, and the voltage to be applied to the supply roller 32 and the voltage to be applied to the developing blade 33 are −425 V. With such a configuration, it is possible to apply a toner with negative charging performance, for example.

For example, it is possible to apply the same voltage from the image forming apparatus to the supply member and the regulating member via a first supply electrode electrically connected to the supply member and the regulating member. For example, it is possible to apply the same voltage from the same power source.

In other words, each of the potential of the supply roller 32 and the potential of the developing blade 33 is set such that the potential difference with respect to the potential of the developing roller 31 becomes a potential difference on a minus side. In other words, each of the potential of the supply roller 32 and the potential of the developing blade 33 is set to be a higher potential on the normal charge polarity (the negative polarity in the present embodiment) side of the toner than the potential of the developing roller 31. It is thus possible to bias the toner from the supply roller 32 toward the developing roller 31 and to appropriately supply the toner to the developing roller 31. Also, it is possible to appropriately apply the electric charge with the normal charge polarity to the toner by the developing blade 33.

Additionally, the bright portion potential is set to −70 V, and the dark portion potential is set to −525 V. In other words, the developing potential difference for the development (developing contrast) is 255 V, and the potential difference for non-image formation (back-contrast) is 200 V.

Figure 4A:
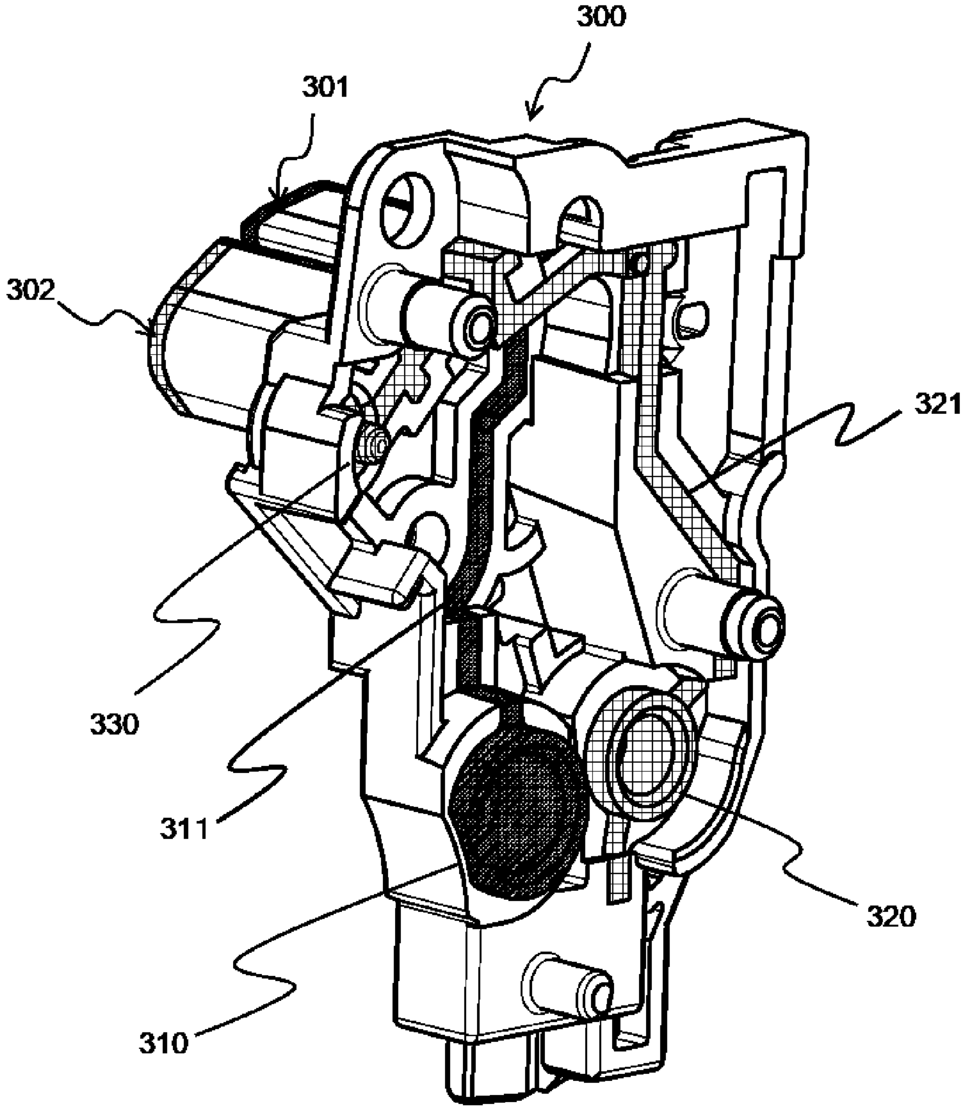
FIG. 4A is an example of a voltage supply component.
Figure 4B:
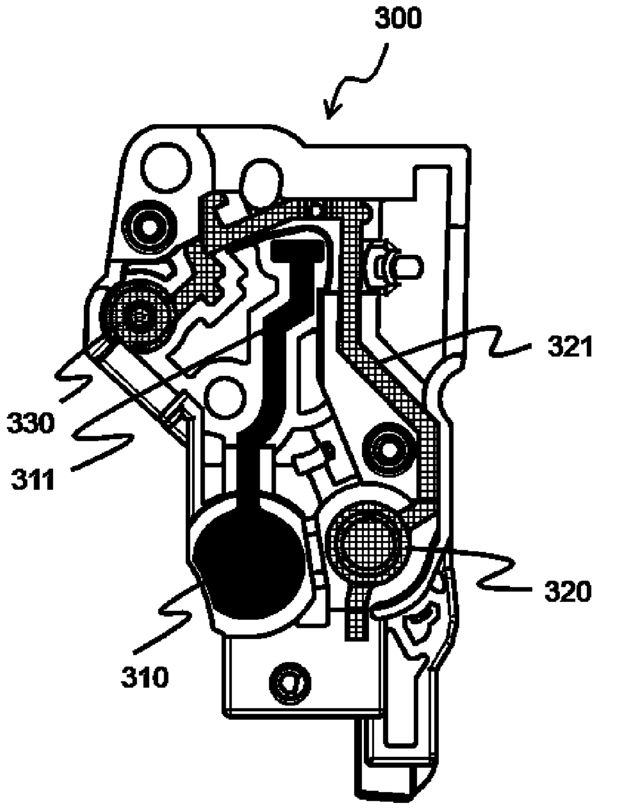
FIGS. 4B and 4C are the example of the voltage supply component.
Figure 4C:
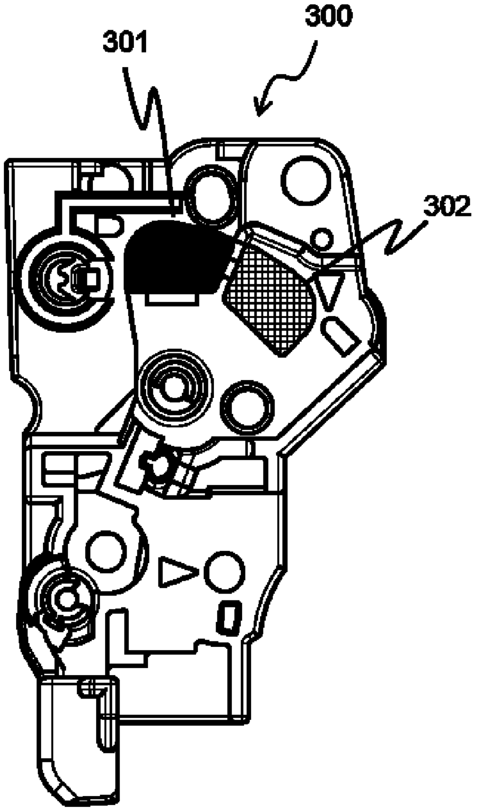

The voltages supplied to the developing blade 33 and the supply roller 32 will be described in more detail by using FIGS. 4A, 4B, 4C and 5. FIGS. 4A, 4B, and 4C are a perspective view (FIG. 4A), a front view (FIG. 4B), and a rear view (FIG. 4C) of a voltage supply component 300 for supplying voltages from a developing voltage main body contact point 182 and a supply/regulating main body contact point 183 to the developing roller 31, the developing blade 33, and the supply roller 32.

The front view is a diagram seen from the side on which it is installed in the image forming apparatus, and the rear view is a diagram seen from the side where it is installed along with the developing roller 31, the supply roller 32, and the like that are the process cartridge 1. In other words, the front view is a diagram seen from the side on which the developing roller 31 and the like are disposed, and the rear view is a diagram seen from the side on which it can be viewed in a case where the process cartridge 1 is seen from the outer side.

Figure 5:
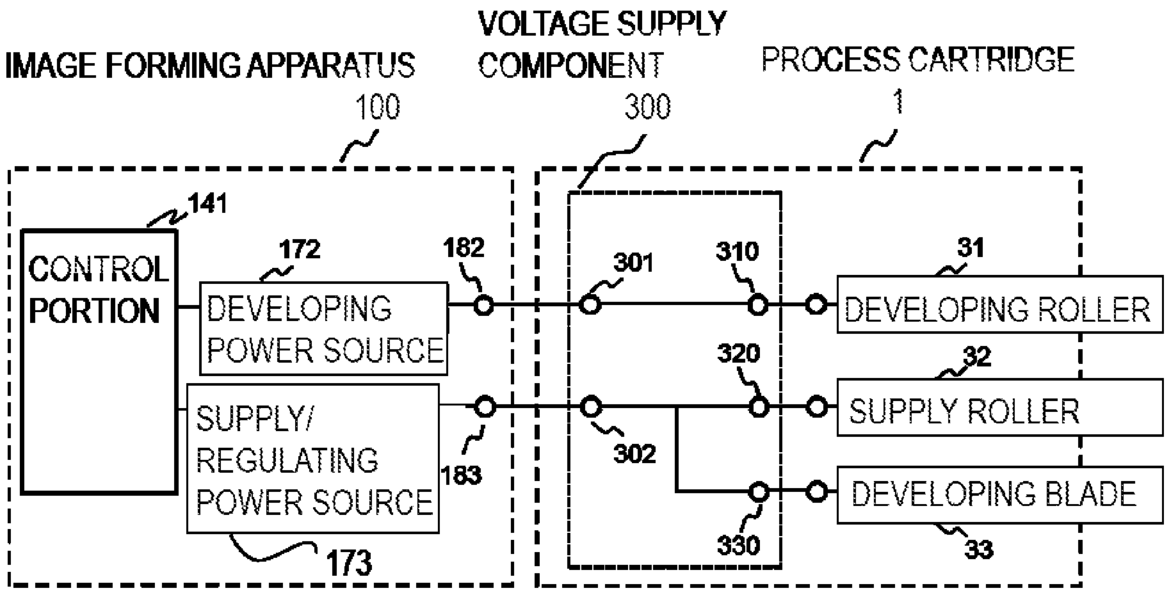
FIG. 5 is an example of a circuit diagram.

FIG. 5 is a circuit diagram in which voltages are applied from the developing voltage main body contact point 182 and the supply/regulating voltage main body contact point 183 of the image forming apparatus 100 to the developing roller 31, the supply roller 32, and the regulating blade 33 of the process cartridge 1.

The voltage supply component 300 includes a developing voltage contact point 301 that comes into contact with the developing power source main body contact point 182 provided in the image forming apparatus 100 and a supply/regulating voltage contact point 302 that comes into contact with the supply/regulating voltage main body contact point 183. A conductive path 311 is formed of a conductive resin to establish conduction between the developing voltage contact point 301 and a developing roller holding portion 310 that holds a shaft of the developing roller 31 (the black parts in FIGS. 4A, 4B, and 4C).

Similarly, a conductive path 321 that establishes conduction between a supply roller holding portion 320 that holds a shaft of the supply roller 32 and a regulating blade contact point 330 that comes into contact with the regulating blade 33 from the supply/regulating voltage contact point 302 is formed of a conductive resin (the hatched portions in FIGS. 4A, 4B, and 4C). The conductive resin 311 from the developing voltage contact point 301 to the developing roller holding portion 310 and the conductive resin 321 from the supply/regulating voltage contact point 302 to the supply roller holding portion 320 and the regulating blade contact point 330 are independently formed. Therefore, it is possible to apply independent voltage thereto (see the circuit diagram in FIG. 5).

Figure 3:
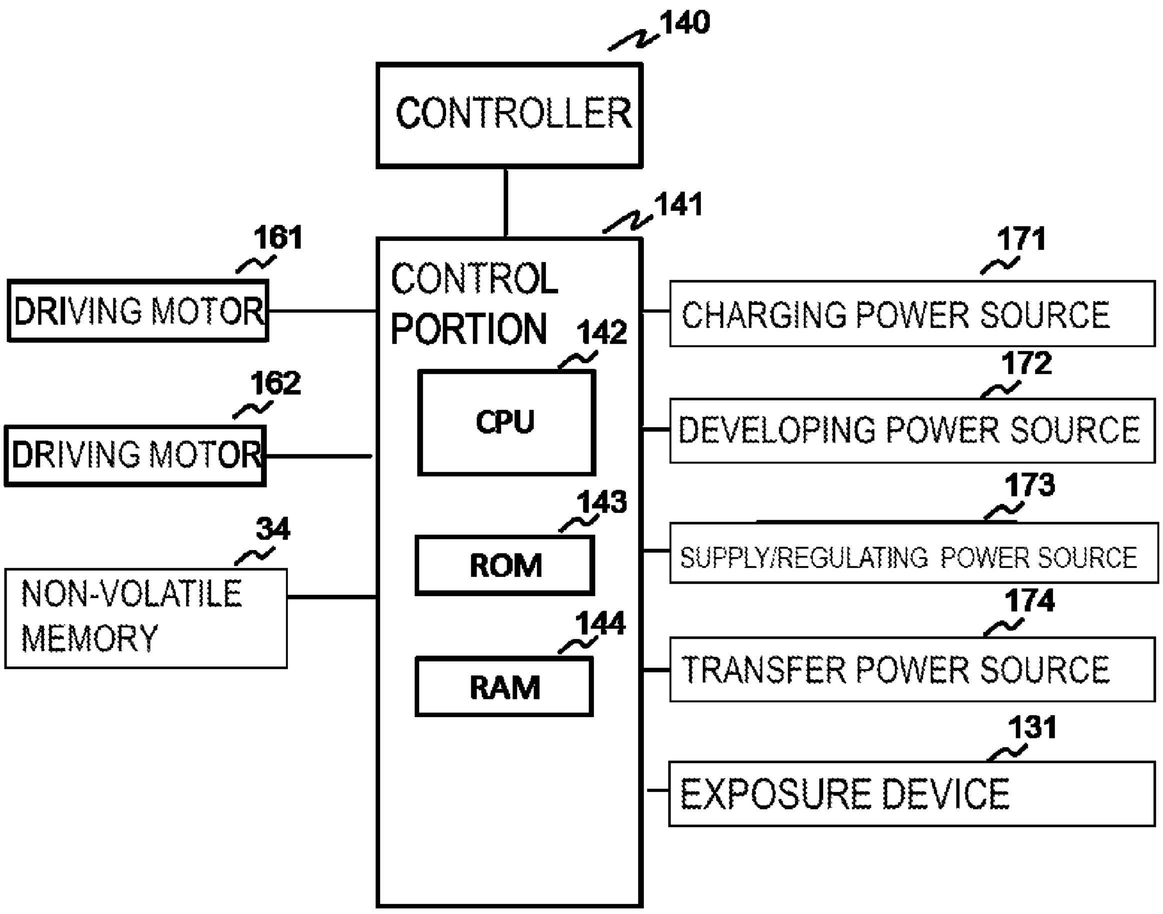
FIG. 3 is a conceptual diagram of an image forming apparatus driving system.

As described above, the number of power sources supplied from the image forming apparatus 100 to the supply roller 32 and the developing blade 33 is one, and the power source is a supply/regulating power source 173 (FIG. 3). The supply/regulating voltage main body contact point 183 of the supply/regulating power source 173 provided in the image forming apparatus 100 and the supply/regulating voltage contact point 302 of the voltage supply component 300 accompanying the developing device 2 come into contact with each other, it becomes possible to supply the output voltage of the main body of the image forming apparatus 100 to the developing device 2.

The supply/regulating voltage contact point 302 is connected to the supply/regulating voltage main body contact point 183, and a voltage from the supply/regulating power source 173 is supplied, by the process cartridge 1 being attached to the image forming apparatus 100. As described above, it is possible to apply the same voltage to the developing blade 33 and the supply roller 32 by branching the voltage from the same power source inside the cartridge.

In a case where a power source to supply a voltage to the supply roller 32 and a power source to supply a voltage to the developing blade 33 are different, the supply voltages are difference from each other in a strict sense due to individual differences of the power sources, and it is thus difficult to set the same potential for the supply roller 32 and the developing blade 33. The variations in voltages due to the individual difference of the power sources typically increase in a case where inexpensive power sources are used. It Is possible to supply, with an inexpensive configuration, a voltage with no potential difference to the developing blade 33 and the supply roller 32 irrespective to individual differences of the power supplies of the image forming apparatus 100 by adopting the voltage application configuration as described above for the developing device 2.

In the present embodiment, voltage supply of the voltage supply component 300 from the image forming apparatus to the process cartridge is performed by the conductive resin. The voltage supply is not necessarily performed by the conductive resin, and the conductive resin may be replaced with metal, or a part of the conductive resin may be replaced with metal.

In this manner, a predetermined developing voltage (developing bias) is applied from the developing power source 172 (FIG. 3) serving as a developing voltage application mechanism (developing voltage application portion) to the developing roller 31 at a predetermined timing at the time of development. A DC voltage with a negative polarity as the developing voltage is applied to the developing roller 31. Also, a predetermined voltage (supply/regulating bias) is applied from the supply/regulating power source 173 (FIG. 3) serving as a supply/regulating voltage application mechanism (supply/regulating voltage application portion) to the developing blade 33 and the supply roller 32 at a predetermined timing at the time of development. Note that it is also possible to adopt a configuration in which a voltage from the supply/regulating power source 173 is applied to the developing roller 31 as well similarly to the developing blade 33 and the supply roller 32.

A DC voltage that is higher on the normal charge polarity (the negative polarity in the present embodiment) side of the toner than the developing voltage is applied as the supply/regulating voltage to the developing blade 33 and the supply roller 32.

Note that the control portion 141 includes a CPU 142, a ROM 143, and a RAM 144. The CPU 142 is adapted to provide instructions for image posting operations, such as a voltage application timing, a voltage value, and a driving timing. The ROM 143 stores information for allowing the CPU to determine operations to be designated through instructions. The RAM 144 stores information for allowing the CPU to provide the instructions similarly to the ROM 143 and can update the information. Also, a controller 140 transmits image information to be printed to the control portion 141.

Also, the developing cartridge may comprise an electric element between the first supply electrode (for example, the supply/regulating voltage contact point 302) and the supply member 32. The developing cartridge may comprise an electric element between the first supply electrode and the regulating member 33. Furthermore, the developing cartridge may comprise an electric element between a second supply electrode (for example, the developing voltage contact point 301) and the developing roller 31.

Here, the electric element is an electric element that changes the application voltage such as a resistor or a diode.

It is possible to control the application voltage to a desired value that is different from that for the regulating member 33 by comprising the electric element between the first supply electrode and the supply member 32. It is possible to control the application voltage to a desired value that is different from that for the supply member 32 by comprising the electric element between the first supply electrode and the regulating member 33.

Also, it is possible to control the application voltage to a desired value that is different from those for the regulating member 33 and the supply member 32 by comprising the electric element between the second supply electrode and the developing roller 31. It is possible to curb influences of variations in power sources on the electric charge of the toner as will be described later even if a resistor or the like is inserted into the voltage supply path as described above as long as the supply power sources are the same.

Toner

Next, the toner will be further described on the basis of an estimation mechanism with which it is possible to curb fogging and developing ghost irrespective of variations in voltage outputs of power sources of the main body.

The cartridge comprises the first supply electrode to which a voltage is supplied from the outside of the cartridge as described above, and the supply member and the regulating member are electrically connected to the supply/regulating power source 173 (FIG. 3) that is the same first supply electrode. In this manner, the supply member and the regulating member have the same fluctuation of the application voltages due to variations in voltage outputs of the supply electrodes.

Here, a case where voltages to be applied to the supply member and the regulating member become high due to variations in voltage outputs of the power sources will be described as an example. The present disclosure employs a cleanerless configuration, and the toner forming a toner image on the photosensitive member 11 is required to include a toner with an electric charge with an opposite polarity (positively charged) or a toner with an electric charge that is close to zero as described above. However, in a case where the voltage applied to the supply member is raised as described above, the amount of supplied toner increases, and this leads to degradation of Q/M which is a charge quantity per unit mass in consideration of the mass M of the toner. In this regard, it is not easy to use the toner with a small charge quantity, in particular, for the cleanerless configuration in views of variations in supply bias and regulating bias.

However, since the supply member and the regulating member are electrically connected to the same first supply electrode in the cartridge according to the present disclosure, the voltage applied to the regulating member is raised equivalently to the voltage to be applied to the supply member. If the voltage to be applied to the regulating member is raised, the charge quantity of the toner is raised at the time of the passing through the regulating member, and the degradation of Q/M can thus be compensated for. Therefore, it is possible to appropriately curb opposite charging of the toner even in a case of the toner with a small charge quantity. It is possible to obtain an effect of curbing fogging and developing ghost by applying a specific toner to such a configuration. The configuration of the present disclosure is suitable in view of the cleanerless configuration.

If the voltage supply contact point to the image forming apparatus in the developing unit is the same, then the voltages to be supplied to the supply roller and the developing blade are not required to be the same. For example, the image forming apparatus and the developing unit have the same contact point, and it is also possible to change the potential difference of the supply roller or the developing blade with respect to the developing roller by inserting an electric element such as a resistor to the voltage supply path for supplying the voltage from the contact point to the supply roller or the developing blade.

Preferably, the developing roller is not electrically connected to the supply member and the regulating member. The developing cartridge preferably comprises the second supply electrode, which is a supply electrode that is different from the first supply electrode, to which a voltage is supplied from the outside of the cartridge. Additionally, the developing roller is preferably electrically connected to the second supply electrode.

The voltages to be supplied to the supply roller and the regulating blade are not required to be the same as long as the voltage supply contact point to the image forming apparatus in the developing unit is the same. For example, the image forming apparatus and the developing unit have the same contact point, and it is also possible to change the potential difference of the supply roller or the regulating blade with respect to the developing roller by inserting a resistor or the like into the voltage supply path for supplying the voltage from the contact point to the supply roller or the regulating blade.

Figure 6:
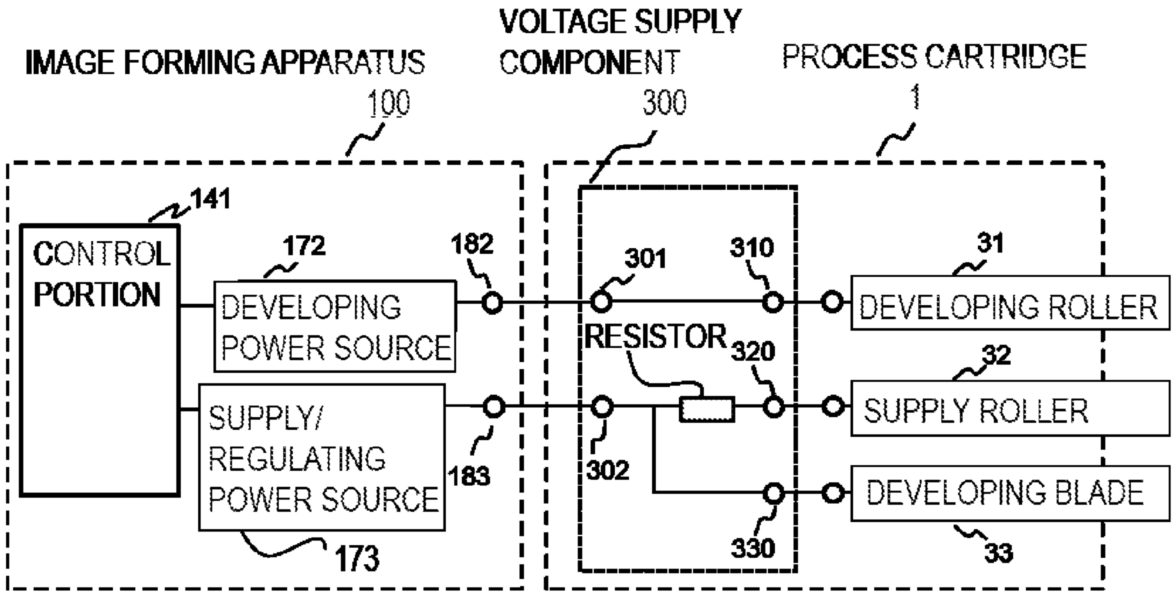
FIG. 6 is an example of a circuit diagram.
Figure 7:
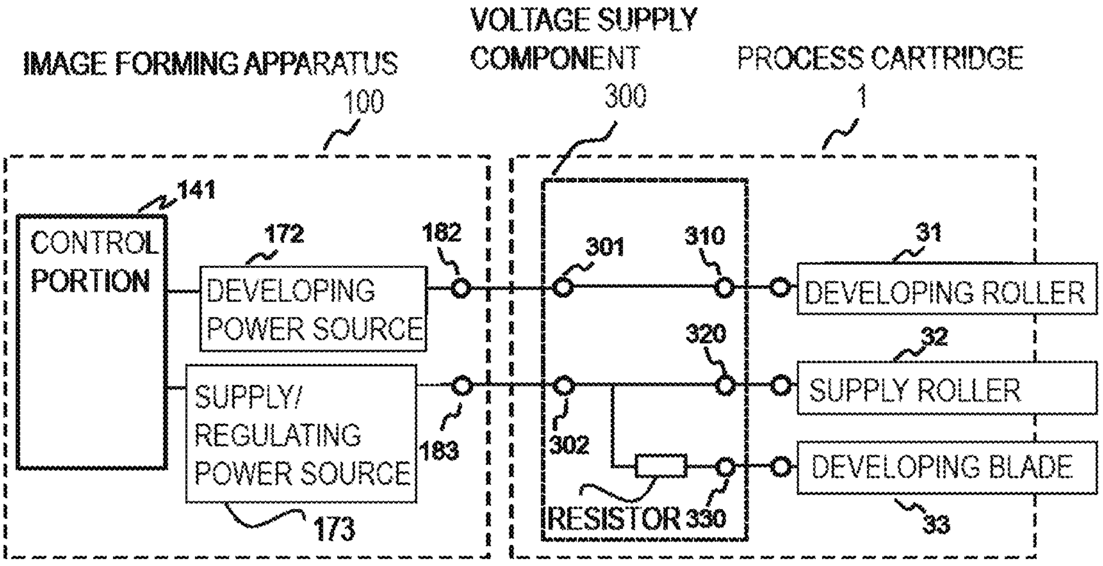
FIG. 7 is an example of a circuit diagram.

A circuit diagram in which a resistor is inserted before the supply roller is illustrated in FIG. 6, and a circuit diagram in which a resistor is inserted before the developing blade is illustrated in FIG. 7. It is still possible to curb influences of variations in power sources on the electric charge of the toner by the effect of imparting the electric charge to the supply roller, the developing blade, and the toner by inserting the resistor or the like into the voltage supply path.

Figure 8:
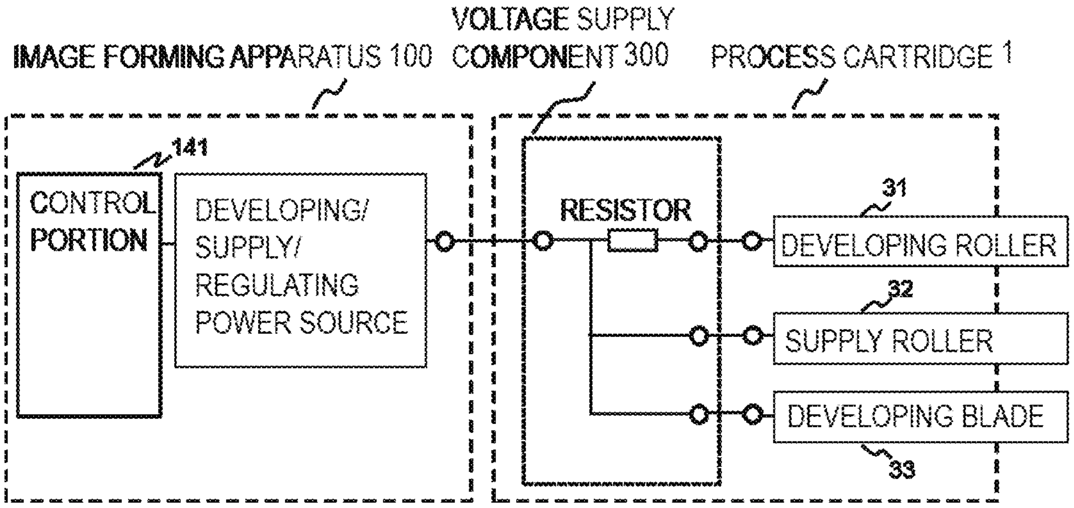
FIG. 8 is an example of a circuit diagram.

Additionally, a circuit diagram when the number of voltage output contact points of the image forming apparatus is one is illustrated in FIG. 8. Even if the number of voltage outputs from the image forming apparatus is one, it is possible to set the absolute value of the voltage to be applied to the developing roller inside the process cartridge to be smaller than the voltages to be applied to the supply roller and the developing blade through the insertion of the resistor or the like. In this manner, it is possible to cause the voltages to be applied to the supply roller and the developing blade to similarly change even when there are variations in voltage outputs while setting larger absolute values of the voltages to be applied to the supply roller and the developing blade than the voltage to be applied to the developing roller.

The toner comprises a compound A having a partial structure represented by Formula (1) below.

$$—(CH_2CH_2O)— \quad (1)$$

Then, the compound A is eluted in methanol when elution treatment is performed on the toner under the elution condition A. Moreover, a supernatant obtained by centrifuging the eluate obtained by eluting the compound A in methanol under the centrifugation condition A is analyzed within a range of m/z=50 to 1500 by liquid chromatograph ESI/MS. At this time, presence of a reference peak defined as follows is required. Also, average m/z defined as follows is required to be 300 to 1000.

Reference peak: A relative abundance is obtained on the assumption that an abundance of a peak of the highest strength in a mass analysis spectrum obtained by liquid chromatograph ESI/MS of the supernatant is 100%. Peaks are chosen in a descending order of the relative abundance, and an m/z value of a peak top of the chosen peaks is defined as P. A chosen peak with the highest relative abundance is defined as the reference peak from among the chosen peaks including peaks with a relative abundance of not less than 10% and with m/z values of P +44 or P −44 at peak tops.

Average m/z: The m/z value at the peak top of the reference peak defined as described above is defined as Ps, and the m/z value at the peak top=Ps+44n (n is an integer), and an average value of m/z at peak tops of peaks with a relative abundance of not less than 30% is defined as an average m/z.

With such features, the electric charge is caused to moderately leak from the strongly charged portion on the surface of the toner caused by localization of the external additive as described above and the like to the weakly charged portion or the outside via the structure represented by Formula (1) of the compound A. It is considered that this provides a toner with a moderately small charge quantity and sharp charge distribution.

The present inventors consider the reason as follows. The structure represented by Formula (1) is considered to be likely to move the electric charge via the structure since alkyl groups having an electron-donating character and oxygen atoms having an electron-withdrawing character alternately continue therein. Also, the fact that it is eluted in methanol which is a highly polar solvent when the elution treatment is performed under the elution condition A means that the substance has a high polarity and is easily electrically charged.

Since the component is eluted on the side of methanol when the toner is immersed in methanol, it is considered that the component is destabilized in the toner and is in a state where it is likely to have a polarity regardless of whether it is located on the surface of the toner or inside the toner. Therefore, it is predicted that the structure represented by Formula (1) is in a state where the electric charge is likely to be taken from the strongly charged portion.

Additionally, having moderate average m/z in the liquid chromatograph ESI/MS means that ionization is likely to occur and the molecular weight is moderate with respect to the charge number. It is considered to have a characteristic that the electric charge is likely to be taken from the strongly charged portion by having the structure represented by Formula (1) due to the feature that ionization is likely to occur.

Also, it is considered that movement of the electric charge from the strongly charged portion to the weakly charged portion of the toner is likely to be promoted via mildly continuous connection that the compound A has inside the toner since the molecular weight is moderate with respect to the charge number, the electric charge is likely to move via molecular chains, and the compound A has the connection.

The presence of the structure represented by Formula (1) is checked by checking a peak with an m/z value of P +44 or P −44 with respect to P of the chosen peaks. The fact that there are at least two or more peaks observed at equal intervals at a cycle of m/z=44 means that a plurality of compounds A in which only the number of repetitions of the structure represented by Formula (1) is different are included. Note that an example of the mass analysis spectrum of the liquid chromatograph ESI/MS is illustrated in FIG. 1.

It is considered that compounds in which the numbers of repetitions of the structure represented by Formula (1) are small are likely to act on each other and are thus likely to take electric charge from the strongly charged portion and compounds in which the numbers of repetitions are large are likely to promote movement of the electric charge. It is predicted that the effect is exhibited by the plurality of compounds A in which the numbers of repetitions of the structure represented by Formula (1) are different being included to satisfy average m/z.

In order to have this property, average m/z is required to be 300 to 1000. Average m/z is preferably 400 to 900, is more preferably 450 to 800, and is further preferably 500 to 720.

In a case where average m/z is less than 300, the continuous connection of the compound A inside the toner is weak, movement of the electric charge is not promoted, and developing ghost is thus not improved. Also, in a case where average m/z is greater than 1000, the electric charge excessively moves, it is considered that an oppositely charged toner is likely to be generated when a toner with a small charge quantity is used, and fogging occurs.

Average m/z can be appropriately adjusted by changing a synthesis time, the type of aliphatic alcohol at the time of the synthesis, the number of parts of aliphatic alcohol, the number of parts of ethylene oxide, and the like.

In order to cause the toner to contain the compound A with such a feature, it is preferable to use a material that is not coupled to a binder resin of the toner and is independently present. For example, it is possible to use a surfactant having the structure of Formula (1) as follows.

Preferably, the compound A includes at least one compound selected from a group consisting of polyoxyethylene lauryl ether, polyoxyethylene hexdecyl ether, polyoxyethylene nonylphenyl ether, polyoxyethylene dodecyl ether, polyoxyethylene sorbitan monooleate ether, polyoxyethylene styrylphenyl ether, sodium polyoxyethylene (2) laurylether sulfate, sodium polyoxyethylene lurylether acetate, and the like.

Preferably, the compound A is at least one compound selected from a group consisting of an ethylene oxide adduct of linear aliphatic alcohol having 8 to 16 (preferably 10 to 14) carbon atoms and sodium polyoxyethylene laurylether acetate, and is more preferably an ethylene oxide additive of lauryl alcohol.

Examples of a way to cause the peaks with m/z values of P +44 or P −44 with respect to P of the chosen peaks to be present include using a method of obtaining an ethylene oxide additive by causing condensation polymerization between an aliphatic alcohol and an ethylene oxide. In this manner, it is possible to cause the polymerization level to have distribution and to cause desired peaks to be present.

Although the addition method is not particularly limited, examples thereof include a method of adding the compound A having the structure of Formula (1) by any of the processes of producing the colorant dispersion, the release agent dispersion, the resin particle dispersion, and the like and a process of washing the toner in a case where the toner is manufactured by an emulsion aggregation method. It is preferable to add the compound A when each dispersion such as the colorant dispersion, the release agent dispersion, or the resin particle dispersion is produced. Also, it is preferable to add the compound A in the mixture solution (that is, in the dispersion process) when these aggregated particles are produced.

The toner manufacturing method is not particularly limited, and any method such as a suspension polymerization method, a dissolution suspension method, an emulsion aggregation method, or a grinding method may be used. The emulsion aggregation method in which a surfactant is typically used in the process of toner formation can be preferably used in terms of easiness in manufacturing.

The toner is preferably a negatively charged toner. Also, a supernatant obtained through treatment under the elution condition A and the centrifugation condition A is supplied to a liquid chromatograph ESI/MS analysis device and is analyzed under the analysis condition A. At this time, the compound A comprised in the supernatant is preferably detected in the ionized form as a cation.

Analysis condition A: Under conditions of Sheath gas: 10 (arb. unit.), Aux gas: 5 (arb. unit.), spray voltage: 5 kV, and capillary temperature: 275° C., the compound ionized under conditions of capillary voltage: 35 V and tube lens voltage: 110 V is detected as a cation, and the compound ionized under conditions of capillary voltage: −35 V and tube lens voltage: −110 V is detected as anion.

Having the property means that the compound A is likely to have positive charging performance. Therefore, since electric charge is more likely to be taken from the negatively charged strong charged portion generated in the negatively charged toner, the effect is further exhibited.

As the compound A having such a property, it is possible to use a cationic surfactant having the structure of Formula (1), a nonionic surfactant having the structure of Formula (1), or the like. As a specific illustrative example, it is possible to preferably use the compounds listed as illustrative examples of the surfactant having the structure of Formula (1) described above.

Also, the toner preferably comprises a compound B eluted in methanol when elution treatment is carried out on the toner under the elution condition A. Then, the supernatant obtained through the treatment on the toner under the elution condition A and the centrifugation condition A is supplied to a liquid chromatograph ESI/MS analysis device and is analyzed under the analysis condition A. At this time, the compound B comprised in the supernatant is preferably detected in the ionized form as anion.

Developing ghost and fogging are more easily curbed by using the compound B that is likely to be negatively charged and the compound A that is likely to be positively charged together. It is predicted that the reason is that the electric charge becomes more uniform since the compound A is more uniformly dispersed in the toner due to electrical repulsion and the oppositely charged toner is more unlikely to occur due to variations in outputs of the power source voltages of the main body.

Also, a peak is preferably detected at m/z=325 in a case where the supernatant obtained through the treatment on the toner under the elution condition A and the centrifugation condition A is analyzed by the liquid chromatograph ESI/MS analysis device. Additionally, a peak is preferably detected at m/z=183 or m/z=197 in a case where the peak detected at m/z=325 is analyzed by a tandem mass spectrometer connected directly to the liquid chromatograph ESI/MS device under the analysis condition B.

Analysis condition B: Under conditions of Sheath gas: 10 (arb. unit.), Aux gas: 5 (arb. unit.), spray voltage: 5 kV, and capillary temperature: 275° C., the compound ionized under conditions of capillary voltage: −35 V and tube lens voltage: −110 V is detected as anion, and an ion detected at m/z=325 is selected as precursor ion, and an ion obtained by causing collision-induced dissociation with an inert gas: He at a collision energy: 35 eV is detected.

The fact that the detection of anion and the detection of the specific peak in tandem mass analysis are satisfied means that a compound having a dodecylbenzenesulfonic acid structure is contained as the compound B in the toner.

As a result, opposite charging is curbed, and fogging can be further curbed even in a case where there are variations in outputs of power source voltages. This is predicted to be because the compound B that is likely to have negative charge is also likely to be ionized and has a moderate molecular weight with respect to the charge number, electric exchange of the compounds A and B are moderately performed, and a desired small charge quantity is likely to be maintained.

In order to cause the toner to contain the compound B, it is preferable to use a material that is independently present without being linked to a binder resin in the toner. For example, an anionic surfactant can be preferably used.

Preferable examples of the compound B include at least one compounds selected from a group consisting of fatty soaps such as sodium stearate and sodium laurate, sodium lauryl sulfate, (linear or branched) sodium dodecylbenzene sulfonate, sodium polyoxyethylene (2) lauryl ether sulfonate, and the like. The compound B is preferably linear or branched sodium dodecylbenzene sulfonate.

Among these, a material having a dodecylbenzenesulfonic acid structure can be more preferably used in order to control a peak to be detected at m/z=183 or 197 in a case where a peak is detected at m/z=325 and analysis is performed under the analysis condition B.

Although the addition method is not particularly limited, examples thereof include a method of adding the compound described above by any of the processes of producing the colorant dispersion, the release agent dispersion, the resin particle dispersion, and the like and a process of washing the toner in a case where the toner is manufactured by an emulsion aggregation method, for example. It is preferable to add the compound B when each dispersion such as the colorant dispersion, the release agent dispersion, or the resin particle dispersion is produced. Also, it is preferable to add the compound B in the mixture solution (that is, in the dispersion process) when these aggregated particles are produced.

The toner manufacturing method is not particularly limited, and any method such as a suspension polymerization method, a dissolution suspension method, an emulsion aggregation method, or a grinding method may be used. The emulsion aggregation method in which a surfactant is typically used in the process of toner formation can be preferably used in terms of easiness in manufacturing.

The content proportion of the structure represented by Formula (1) contained in the compound A on the basis of the mass of the toner is preferably 50 to 1500 ppm by mass. The content proportion is more preferably 70 to 1200 ppm by mass and is further preferably 250 to 1060 ppm by mass.

In a case where the content of the structure of Formula (1) is equal to or less than 1500 ppm by mass, leakage of electric charge due to the compound A becomes more moderate in the toner with a small charge quantity, the charge quantity is likely to be maintained, and fogging can be further curbed. On the other hand, in a case where the content is equal to or greater than 50 ppm by mass, developing efficiency becomes more satisfactory, and developing ghost is more likely curbed.

The content of the structure represented by Formula (1) can be controlled by changing the amount of compound A to be added, washing strength of the toner, or the number of structures represented by Formula (1) contained in the molecules of the compound A. Examples of a method for changing the number of structures represented by Formula (1) in the molecules of the compound A include a method of changing the amount of precursor having the structures represented by Formula (1) and a polymerization condition when the compound A is produced and the like.

As a method for quantifying the structure represented by Formula (1), a method in which a peak originating from the structure of Formula (1) is specified by $^1H$ nuclear magnetic resonance spectrometry and quantification is performed by $^1H$ nuclear magnetic resonance spectrometry using an internal standard method can be used.

Also, chromatogram analyzed under the following analysis condition C is obtained in analysis under the analysis condition A of a supernatant obtained through treatment on the toner under the elution condition A and the centrifugation condition A.

Analysis condition C: When 10 μL of solution is poured into an apparatus configuration using methanol in a mobile phase and not using any stationary phase at a flow rate of 1 ml/min, a range of m/z=50 to 1500 is analyzed by setting an acquisition time to 5 min and using a UV detector as a detector, and chromatogram is acquired.

A value of ratio P/N of a peak area P of a cation containing the compound A with respect to a peak area N of anion containing the compound B is preferably 0.20 to 2.00 in the obtained chromatogram. The ratio value P/N is more preferably 0.25 to 1.20 and is further preferably 0.30 to 1.00.

Having this feature indicates that a material that is likely to be positively charged such as the compound A and a material that is likely to be negatively charged such as the compound B are contained in the toner with a moderate balance.

If the P/N ratio is equal to or greater than 0.20, developing ghost is more likely to be curbed, and this is predicted to be because excessive negative charging can be curbed by the positively charged components being moderately large in amount or by the negatively charged components being moderately small in amount.

On the other hand, if the P/N ratio is equal to or less than 2.00, fogging is more likely to be curbed, and this is predicted to be because generation of oppositely charged toner is likely to be curbed by the negatively charged components being moderately large in amount or by the positively charged components being moderately small in amount. The P/N ratio can be controlled by the amounts of the compound A and the compound B to be added.

P is preferably 300000 to 1500000 and is more preferably 500000 to 1100000, for example. N is preferably 400000 to 4000000 and is more preferably 800000 to 2000000, for example.

Hereinafter, each component configuring the toner and a method for manufacturing the toner will be described.

The toner particle contains a binder resin. The content of the binder resin is preferably equal to or greater than 50% by mass with respect to the total amount of the resin component in the toner particle.

Although the binder resin is not particularly limited, examples thereof include a styrene acrylic resin, an epoxy resin, a polyester resin, a polyurethane resin, a polyamide resin, a cellulose resin, a polyether resin, and mixed resins or composite resins thereof. The binder resin is preferably at least one selected from a group consisting of a styrene acrylic resin and a polyester resin.

Examples of the styrene acrylic resin include polymers composed of the following monofunctional polymerizable monomer or polyfunctional polymerizable monomer, copolymers obtained by combining two or more types thereof, and further mixtures thereof. The styrene acrylic resin is preferably a polymer of a monomer mixture containing styrene and at least one selected from a group consisting of an acrylic polymerizable monomer and a methacrylic polymerizable monomer. The monomer mixture may contain a (meth)acrylic acid.

Examples of the monofunctional polymerizable monomer include the following monofunctional polymerizable monomers.

Styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylsyrene, p-n-decylsyrene, p-n-dodecylsyrene, p-methoxysyrene, and p-phenylsyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid ester; vinyl ester such as vinyl acetate, vinyl propionate, vinyl butyrate, vinyl benzoate, and vinyl formate; vinyl ether such as vinyl methyl ether, vinyl ethyl ether, and vinyl isobutyl ether; and vinyl ketone acrylic acids and methacrylic acids such as vinyl methyl ketone, vinyl hexyl ketone, and vinyl isopropyl ketone.

Examples of the polyfunctional polymerizable monomer include the following polyfunctional polymerizable monomers.

Diethylene glycol diacrylate, triethylene glycol diacrylate, tetraethylene glycol diacrylate, polyethylene glycol diacrylate, 1,6-hexanediol diacrylate, neopentyl glycol diacrylate, tripropyelen glycol diacrylate, polypropylene glycol diacrylate, 2,2'-bis(4-(acryloxy diethoxy)phenyl)propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy diethoxy)phenyl)propane, 2,2'-bis(4-(methacryloxy polyethoxy)phenyl)propane, trimethylolpropane trimethacrylate, tetramethylolmethane tetramethacrylate, divinylbenzene, divinylnaphthalene, divinylether, and the like.

As the polyester resin, it is possible to use a product of condensation polymerization of a carboxylic acid component and an alcohol component listed below. Examples of the carboxylic acid component include a terephthalic acid, an isophthalic acid, a phthalic acid, a fumaric acid, a maleic acid, a cyclohexanedicarboxylic acid, and a trimellitic acid. Examples of the alcohol component include bisphenol A, hydrogen-added bisphenol, an ethylene oxide adduct of bisphenol A, a propylene oxide adduct of bisphenol A, glycerin, trimethylolpropane, and pentaerythritol.

Also, the polyester resin may be a polyester resin containing a urea group. The polyester resin preferably does not cap a carboxyl group at a terminal or the like.

The toner particle may contain a colorant. As the colorant, it is possible to use a known pigment or dye. A pigment is preferably used as the colorant in terms of excellent weather resistance.

Examples of a cyan colorant include copper phthalocyanine compounds and derivatives thereof, anthraquinone compounds, basic dye lake compounds, and the like.

Specific examples include the following cyan colorants: C.I. Pigment Blue 1, 7, 15, 15:1, 15:2, 15:3, 15:4, 60, 62, and 66.

Examples of a magenta colorant include condensed azo compounds, diketopyrrolopyrrole compounds, anthraquinone compounds, quinacridone compounds, basic dye lake compounds, naphtol compounds, benzimidazolone compounds, thioindigo compounds, perylene compounds, and the like.

Specific examples include the following magenta colorants: C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254, and C.I. Pigment Violet 19.

Examples of a yellow colorant include condensed azo compounds, isoindolinone compounds, anthraquinone compounds, azo metal complexes, methine compounds, allylamide compounds, and the like.

Specific examples include the following yellow colorants: C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of a black colorant include carbon black and colorants with a black color adjusted by using the above yellow colorant, magenta colorant, and cyan colorant.

These colorants can be used alone or as a mixture, or further, these can be used in a state of a solid solution. The colorant is preferably used in the amount of equal to or greater than 1.0 parts by mass and equal to or less than 20.0 parts by mass with respect to 100.0 parts by mass of binder resin. The toner is preferably a non-magnetic toner that does not contain a magnetic material.

The toner can be a magnetic toner by causing it to contain a magnetic material.

In this case, the magnetic material can also play a role as a colorant.

Examples of the magnetic material include iron oxide, representative examples of which include magnetite, hematite, and ferrite; and metal, representative examples of which include iron, cobalt, and nickel, and alloys, mixtures, and the like of such metal with metal such as aluminum, cobalt, copper, lead, magnesium, tin, zinc, antimony, beryllium, bismuth, cadmium, calcium, manganese, selenium, titanium, tungsten, and vanadium.

The toner particle may contain a release agent. The release agent is not particularly limited, and a known wax may be used. Specific examples include the following release agents.

Petroleum wax, representative examples of which include a paraffin wax, a microcrystalline wax, and a peterolatum wax, and derivatives thereof, a montan wax and derivatives thereof, a hydrocarbon wax made by a Fischer-Tropsch process and derivatives thereof, a polyolefin wax, representative examples of which include polyethylene, and derivatives thereof, and a natural wax, representative examples of which include a carnauba wax and a candelilla wax, and derivatives thereof.

The derivatives also include oxides, block copolymers with a vinyl monomer, and graft modifications.

Also, alcohols such as higher aliphatic alcohols; a fatty acid such as a stearic acid and a palmitic acid, acid amide, ester, and ketone thereof; and a hydrogenated castor oil and derivatives thereof, plant waxes, and animal waxes. These can be used alone or in combination.

Among these, polyolefin, a hydrocarbon wax made by a Fischer-Tropsch process, and a petroleum wax are preferably used since there is a trend that a developing property and a transfer property are improved.

Note that an antioxidant may be added to these waxes within a range in which it does not affect the above effect.

The content of the release agent is preferably equal to or greater than 1.0 parts by mass and equal to or less than 30.0 parts by mass with respect to 100.0 parts by mass of binder resin or polymerizable monomer forming the binder resin.

The melting point of the release agent is preferably equal to or greater than 30° C. and equal to or less than 120° C. and is more preferably equal to or greater than 60° C. and equal to or less than 100° C. The release effect is efficiently expressed, and a wider fixation region is secured by using the release agent exhibiting a heat property as described above.

It is possible to externally add an external additive such as various organic or inorganic fine particles to the toner particles as needed. In other words, the toner may contain a toner particle and an external additive on the surface of the toner particle. Also, the surface exposure rate of the toner particle is preferably equal to or greater than 50% by area.

Exchanging of the electric charge by the toner particle is promoted by the surface of the toner particle being sufficiently exposed, and the effect of curbing developing ghost and fogging is more likely to be achieved irrespective of variations in outputs of power source voltages. The surface exposure rate is more preferably 50 to 95% by area and is further preferably 55 to 70% by area. The surface exposure rate can be controlled by the amount of external additive to be added and the like.

The external additive such as organic or inorganic fine particles preferably has a particle diameter of equal to or less than 1/10 the weight average particle diameter of the toner particle in terms of durability when it is added to the toner particle. The content of the external additive is preferably 0.1 to 2.0 parts by mass and is more preferably 0.3 to 0.9 parts by mass with respect to 100 parts by mass of the toner particle.

As the organic or inorganic fine particles, the following organic or inorganic fine particles can be used, for example. Inorganic fine particles of silica and the like are preferably used.

(1) Fluidity imparting agent: silica, alumina, titanium oxide, carbon black, and carbon fluoride.

(2) Abrasive: metal oxides (for example, strontium titanate, cerium oxide, alumina, magnesium oxide, and chromium oxide), nitrides (for example, silicon nitride), carbides (for example, silicon carbide), and metal salts (for example, calcium sulfate, barium sulfate, and calcium carbonate).

(3) Lubricant: fluorine resin powder (for example, vinylidene fluoride, polytetrafluoroethylene), and fatty acid metal salts (for example, zinc stearate and calcium stearate).

(4) Charge controlling particles: metal oxides (for example, tin oxide, titanium oxide, zinc oxide, silica, and alumina), and carbon black.

The surfaces of the organic or inorganic fine particles may be subjected to hydrophobization treatment in order to improve fluidity of the toner and uniformize the charging of the toner particle. Examples of the treatment agent for the hydrophobization treatment of the organic or inorganic fine particles include an unmodified silicone varnish, various modified silicone varnish, an unmodified silicone oil, various modified silicone oil, silane compounds, a silane coupling agent, other organic silicon compounds, and organic titanium compounds. These treatment agents may be used alone or in combination.

Although an example of a method for obtaining the toner particle will be described below, the method is not limited the following one.

The manufacturing method of the toner particle is not particularly limited, and it is possible to use a suspension polymerization method, a dissolution suspension method, an emulsion aggregation method, a grinding method, and the like. A method for obtaining the toner particle by the emulsion aggregation method will be described below as an example.

Method for Manufacturing Toner by Emulsion Aggregation Method Process for Preparing Resin Fine Particle Dispersion Although a resin fine particle dispersion containing a binding resin can be prepared by known methods, the present invention is not limited to these methods. Examples thereof include an emulsion polymerization method, a self-emulsification method, a phase-transfer emulsification method of emulsifying a resin by adding a water-based medium to a resin solution dissolved in an organic solvent, and a forced emulsification method of forcibly emulsifying a resin by performing high-temperature treatment inside a water-based medium without using an organic solvent.

A method of preparing the resin fine particle dispersion by the phase-transfer emulsification method will be described below as an example. Resin components containing a binder resin are dissolved in an organic solvent which allows them to be dissolved therein, and a surfactant and a basic compound are added thereto. At this time, it is only necessary to dissolve the resin components by heating them to a temperature that is equal to or greater than a melting point when the resin components form a crystalline resin having the melting point. Subsequently, a water based medium is slowly added thereto while stirring is performed by using a homogenizer or the like to precipitate the resin fine particles. Thereafter, the solvent is removed by heating them or reducing the pressure, thereby producing a water-based dispersion of the resin fine particles.

Here, any organic solvent may be used to dissolve the resin components containing the binder resin as long as the organic solvent can dissolve them. Specific examples include toluene, xylene, and the like.

As the surfactant to be used in the preparation process, a surfactant containing at least one compound selected from a group consisting of the compound A and the compound B is preferably used. More preferably, a surfactant containing the compound A and the compound B is used.

It is possible to use another surfactant together within a range in which the above effect is not damaged, and examples thereof include anionic surfactants such as a sulfuric ester salt-based surfactant, a sulfonate-based surfactant, a carboxylate-based surfactant, a phosphoric acid ester, and a soap-based surfactant; cationic surfactants such as an amine salt-type surfactant and a quaternary ammonium salt-type surfactant; and non-ionic surfactants such as a polyethylene glycol-based surfactant, an alkylphenol ethylene oxide adduct-based surfactant, and a polyhydric alcohol-based surfactant, and the like.

Examples of the basic compound used in the preparation process include inorganic base such as sodium hydroxide and potassium hydroxide; and organic base such as ammonia, triethylamine, trimethylamine, dimethylaminoethanol, and diethylaminoethanol. One kind of basic compound may be used alone, or two or more kinds thereof may be used together.

Preparation of Colorant Dispersion

For preparation of the colorant dispersion, a known dispersion method can be used, it is possible to use a general dispersion mechanism such as a homogenizer, a ball mill, a colloid mill, and an ultrasonic dispersing machine, for example, and the method is not limited at all. Also, examples of the surfactant used in the dispersion include the surfactants as described above, and it is possible to preferably use a surfactant containing at least one compound selected from the group consisting of the compound A and the compound B.

Preparation of Release Agent Dispersion

For preparation of the release agent dispersion, a release agent is dispersed in water along with the surfactant, the basic compound, and the like, the mixture is then heated to a temperature that is equal to or greater than the melting point of the release agent, and dispersion treatment is performed by using a homogenizer or a dispersing machine to which a strong shear force is applied. A release agent dispersion is obtained through such treatment. Examples of the surfactant used in the dispersion include the surfactants described above, and it is possible to preferably use a surfactant containing at least one compound selected from the group consisting of the compound A and the compound B. Also, examples of the basic compound used in the dispersion include the basic compounds described above.

Aggregated Particle Formation Process

In an aggregated particle formation process, the resin fine particle dispersion, the colorant dispersion, the release agent dispersion, and the like are mixed first, thereby obtaining a mixture solution (dispersion process). Then, the mixture solution is aggregated by adjusting pH to acid while the mixture is heated at a temperature that is equal to or less than the melting point of the resin fine particles, and aggregated particles containing the resin fine particles, the colorant particles, and the release agent particles are thus formed, thereby obtaining an aggregated particle dispersion.

First Fusion Process

In a first fusion process, progress of the aggregation is stopped by raising pH of the aggregated particle dispersion under a stirring condition in accordance with the aggregated particle formation process, and heating is performed at a temperature that is equal to or greater than the melting point of the resin components, thereby obtaining a fusion particle dispersion.

Filtration Process, Washing Process, Drying Process, Classification Process, and External Addition Process Thereafter, a filtration process for filtering out the sold content of the toner particle, and if needed, a washing process, a drying process, and a classification process for adjusting granularity are performed, thereby obtaining a toner particle. The toner particle may be used as a toner as it is. It is also possible to mix the toner particle and an external additive such as inorganic fine particles by using a mixer, to cause them adhere to each other, and thereby to obtain a toner.

Method for Checking that Compound A is Contained and that Compound A is Detected as Cation while Compound B is Detected as Anion As a method for checking that the compound A having the structure represented by Formula (1) is contained, it is possible to use a method using liquid chromatograph ESI/MS (electrospray ionization mass spectrometry) or a known analysis method such as $^1$H nuclear magnetic resonance spectrometry. In the present disclosure, the analysis method using liquid chromatograph ESI/MS is used. Hereinafter, the analysis method will be described.

As a sample, the toner is used, and the sample after being adjustment under the following elution condition A is separated into a solid content and a supernatant under the centrifugation condition A.

The supernatant obtained through the above adjustment is supplied to the following liquid chromatograph ESI/MS analysis device, and ESI/MS analysis is performed under the analysis condition A.

Elution condition A: Methanol (a product equivalent to JISK8891) in an amount of ten times that of the toner (10 g) by mass is used, and mixture thereof is stirred at 25° C. at a rotor rotation speed of 200 rpm for 10 hours with a multi-stirrer (KSS-8: manufactured by AS ONE Corporation) as a stirring apparatus. For stirring, a triangle rotor (001.440; manufactured by AS ONE Corporation) with a total length×a one-side length: 40×14 mm is used for the stirring.

Centrifugation condition A: Rotation is performed with a rotation radius of 10.1 cm and a rotation speed of 3500 rpm at 25° C. for 30 minutes. It is possible to use a centrifugal machine (H-9R; manufactured by Kokusan) as a centrifugal apparatus.

Measurement apparatus: Ultimate 3000 (manufactured by Thermo Fisher Scientific)

Mass spectrometer: LCQ Fleet (manufactured by Thermo Fisher Scientific)

Analysis condition A: Under the following condition, the compound ionized under the condition of the capillary voltage of 35 V and the tube lens voltage of 110 V is detected as a cation, the compound ionized under the condition of the capillary voltage of −35 V and the tube lens voltage of −110 V is detected as anion, and MS spectra of the cation and the anion are acquired.

Ionization method: Electrospray method (ESI)

Sheath Gas: 10 (arb. unit.)

Aux Gas: 5 (arb. unit.)

Spray voltage: 5 Kv

Capillary temperature: 275° C.

Mobile phase: Methanol (product equivalent to JISK8891 standard)

Column: Not used (stationary phase is not used)

Flow rate: 1 ml/min

Pouring amount: 10 μl

Chromatogram detector: UV detector

MS acquisition time: 5 min

MS Measurement range: 50 to 1500 m/z

A relative abundance is obtained on the assumption that an abundance of a peak of the highest strength in a obtained mass analysis spectrum is 100%. First, a peak of the highest relative abundance is chosen as a chosen peak.

Whether peaks with the relative abundance of not less than 10% and with m/z values having peak top m/z values of P +44 or P −44 are present when an m/z value at the peak top of the chosen peak is defined as P is checked. In a case where such peaks are present, the chosen peak is defined as a reference peak. In a case where such peaks are not present, whether there are peaks with peak top m/z values of P +44 or P −44 are present is similarly checked when a peak with the next highest relative abundance is defined as a chosen peak and the m/z value at the peak top is defined as P. The operation is repeated until the reference peak is defined. For example, the peak at m/z=563 is defined as the reference peak in FIG. 1.

In a case where the reference peak is defined, it is determined that the compound A having the structure represented by Formula (1) is contained.

Calculation of Average m/z Value of Compound A Having Structure Represented by Formula (1)

After the aforementioned reference peak is defined, the m/z value of the reference peak at the peak top is defined as Ps. Then, an average value of m/z at the peak tops of the peaks with peak top m/z values=Ps+44n (n is an integer) and with a relative abundance of not less than 30% is calculated as an average m/z.

Method for Calculating m/z value of Compound B

An m/z value of the compound B is calculated by performing analysis by the MS/MS (mass/mass) method by using a tandem mass spectrometer connected directly to the liquid chromatograph ESI/MS analysis device.

The MS/MS method is a mass analysis method capable of detecting a fragment with a yet smaller molecular weight and capable of easily performing structure analysis of the sample by measuring a fragment extracted by a first analysis system in a second analysis system.

As a sample, the toner was used, and the sample after being subjected to adjustment under the elution condition A is separated into a solid content and a supernatant under the centrifugation condition A.

The supernatant obtained in the adjustment is supplied to the following measurement apparatus, and liquid chromatograph ESI/MS analysis is performed under the analysis condition B. A mass analysis spectrum of anion is obtained, and the fact that a peak is detected at m/z=325 is checked. Also, the ion detected as a peak at m/z=325 is supplied as a precursor ion to the tandem mass spectrometer, and an MS/MS spectrum is acquired under the analysis condition B.

Measurement apparatus: Ultimate 3000 (manufactured by Thermo Fisher Scientific)

Mass spectrometer: LCQ Fleet (manufactured by Thermo Fisher Scientific)

Analysis condition B: Under the following conditions, the compound ionized under conditions of capillary voltage: −35 V and tube lens voltage: −110 V is detected as anion, and an ion detected at m/z=325 is selected as precursor ion, and an ion obtained by causing collision-induced dissociation with an inert gas: He at collision energy: 35 eV is detected.

Ionization method: Electrospray method (ESI)

Sheath Gas: 10 (arb. unit.)

Aux Gas: 5 (arb. unit.)

Spray voltage: 5 Kv

Capillary temperature: 275° C.

Mobile phase: Methanol (product equivalent to JISK8891 standard)

Column: Not used (stationary phase is not used)

Flow rate: 1 ml/min

Pouring amount: 10 μl

Chromatogram detector: UV detector

MS acquisition time: 5 min

MS Measurement range: 50 to 1500 m/z

Collision inert gas: He (helium)

Collision energy: 35 eV

The fact that peaks are detected at m/z=183 or m/z=197 in the obtained mass analysis spectrum of the MS/MS method is checked.

Method for Analyzing area P of Chromatogram Peak of Cation and Area N of Chromatogram Peak of Anion Chromatogram peak areas P and N are calculated by using a chromatogram of the UV detector of the liquid chromatograph obtained at the time of the analysis in the method of checking that the compound A is contained and that the compound A is detected as a cation while the compound B is detected as anion. Specifically, the chromatogram obtained under the analysis condition C is used in the analysis under the analysis condition A.

Analysis condition C: When 10 μL of solution is poured into an apparatus configuration using methanol in a mobile phase and not using any stationary phase at a flow rate of 1 ml/min, a range of m/z=50 to 1500 is analyzed by setting an acquisition time to 5 min and using a UV detector as a detector, and chromatogram is acquired.

Integration is performed using, as a base line, a line connecting points from 0.1 min to 1.0 min for the chromatogram of a cation and the chromatogram of anion obtained. The integrated value is calculated as the peak area value P of the cation and the peak area value N of the anion.

Also, a ratio value P/N of the peak area P of the cation containing the compound A with respect to the peak area N of anion containing the compound B is calculated from obtained P and N.

Method for Measuring Weight Average Particle Diameter (D4) and Number Average Particle Diameter (D1)

The weight average particle diameter (D4) and the number average particle diameter (D1) of the toner are calculated as follows. As a measurement apparatus, a precise granularity distribution measurement apparatus "Coulter Counter Multisizer 3" (registered trademark, manufactured by Beckman Coulter Inc.) that includes an aperture tube of 100 μm and is based on a pore electric resistance method is used. For setting of the measurement condition and analyzing measurement data, an attached dedicated software "Beckman Coulter Multisizer 3 Version 3.51" (manufactured by Beckman Coulter Inc.) is used. Note that the measurement is performed by 25000 effective measurement channels.

As an electrolyte aqueous solution used for the measurement, an electrolyte aqueous solution obtained by dissolving special-grade sodium chloride in ion-exchanged water to have a concentration of about 1% by mass, for example, "ISOTON II" (manufactured by Beckman Coulter Inc.) can be used. Note that setting of the dedicated software is performed as follows before the measurement and the analysis are performed.

On the screen "Change standard measurement method (SOMME)" of the dedicated software, the total count in the control mode is set to 50000 particles, the number of times of measurement is set to once, and a value obtained by using "Standard particles of 10.0 μm" (manufactured by Beckman Coulter Inc.) is set as a Kd value. A threshold value and a noise level are automatically set by pressing the "Threshold/noise level measurement button". Also, the current is set to 1600 μA, the gain is set to 2, the electrolytic solution is set to ISOTON II, and "Flush aperture tube after measurement" is checked.

On the "Conversion setting from pulse to particle diameter" screen of the dedicated software, the pin interval is set to a logarithmic particle diameter, the particle diameter bin is set to a 256-particle diameter bin, and the particle diameter range is set to 2 μm to 60 μm.

Specific measurement method is as follows.

(1) 200 ml of the electrolyte aqueous solution was put into a 250 ml round-bottomed flask made of glass and dedicated for Multisizer 3, the flask is set in a sample stand, and stirring with a stirrer rod is performed in the counterclockwise direction at 24 rotations/second. Also, contamination and air bubbles inside the aperture tube are removed in advance by using the function "Flush aperture tube" of the dedicated software.

(2) 30 ml of the electrolyte aqueous solution is put into a 100 ml flat-bottomed flask made of glass. 0.3 ml of diluted solution obtained by diluting "Contaminon N" (10% by mass of aqueous solution of a neutral detergent for a precise measurement machine with pH 7 including a non-ionic surfactant, an anionic surfactant, and an organic builder; manufactured by Wako Pure Chemicals, Ltd.) with ion-exchanged water to the amount that is about 3 times by mass is added thereto as a dispersant.

(3) An ultrasonic dispersing machine "Ultrasonic Dispersion System Tetra 150" (manufactured by Nikkaki Bios, Co., Ltd.) incorporating two oscillators with an oscillation frequency of 50 kHz in a state where the phases are shifted by 180 degrees and having an electric output of 120 W is prepared. 3.3 L of ion-exchanged water is put into a water tank of the ultrasonic dispersing machine, and 2 ml of Contaminon N is added to the water tank.

(4) The above flask in (2) is set at a flask fixing hole of the ultrasonic dispersing machine, and the ultrasonic dispersing machine is caused to operate. Then, the height position of the flask is adjusted such that the resonance state of the liquid surface of the electrolyte aqueous solution in the flask is maximized.

(5) 10 mg of toner is added little by little to the electrolyte aqueous solution and is dispersed therein in a state where the electrolyte aqueous solution inside the above flask in (4) is irradiated with ultrasonic waves. Then, ultrasonic dispersion treatment is further continued for sixty more seconds. Note that the water temperature in the water tank is appropriately adjusted to be equal to or greater than 10° C. and equal to or less than 40° C. for the ultrasonic dispersion.

(6) The above electrolyte aqueous solution in (5) with the toner dispersed therein is dropped into the above round-bottomed flask in (1) installed in the sample stand by using a pipette, and the measurement concentration is adjusted to 5%. Then, measurement is performed until the number of measurement particles reaches 50000.

(7) Measurement data is analyzed by the dedicated software attached to the apparatus, and the weight average particle diameter (D4) and the number average particle diameter (D1) are calculated. Note that the "Average diameter" on the "Analysis/volume statistical value (arithmetic mean)" screen when graph/% by volume is set in the dedicated software is the weight average particle diameter (D4), and the "Average diameter" on the "Analysis/number statistical value (arithmetic mean)" screen when graph/% by number is set in the dedicated software is the number average particle diameter (D1).

Method for Measuring Content of Structure Represented by Formula (1)

To check the content of the structure represented by Formula (1), $^1H$ nuclear magnetic resonance spectrometry ($^1H$-NMR) is used.

Measurement apparatus: FT NMR apparatus JNM-EX 400 (manufactured by JEOL Ltd.)

Measurement frequency: 400 MHz

Pulse condition: 5.0 μs

Frequency range: 10500 Hz

Number of times of addition: 1024 times

Measurement temperature: 30° C.

Sample: In the method for checking that the compound having the structure represented by Formula (1) is contained, the amount of toner used under the elution condition A is set to 10 g, and the toner is eluted and is subjected to centrifugation under the centrifugation condition A, thereby obtaining a supernatant.

The total amount of obtained supernatant is evaporated, dried, and solidified under the following condensation condition A, thereby obtaining an eluate.

Condensation condition A: A sample flask with the supernatant placed therein is dipped into a constant-temperature water tank at the temperature of 50° C., and condensation is performed at a rotation speed of 50 rol and at a degree of vacuum of 80 mbar for 12 hours. As an apparatus, a rotary evaporator (ARE-V1200 1; manufactured by AS ONE Corporation) is used.

1 ml of heavy methanol ($CD_3OD$) as a solvent is added to the obtained eluate, thereby obtaining a heavy methanol dissolved solution. The total amount of heavy methanol dissolved solution is transferred to a sample tube, and further, 100 ppm of reference substance with reference to the mass of the heavy methanol dissolved solution is added thereto, thereby obtaining a measurement sample.

The used reference substance has a chemical shift that has a signal that is different from any of those detected when $^1H$-NMR analysis is performed by using the heavy methanol dissolved solution and has a known number of protons, is soluble in the quantifiable amount in the heavy methanol dissolved solution, and has a boiling point of not less than 100° C. Here, hexamethyldisilazane having a boiling point of 127° C. and having a signal originating from $(SiCH_3)_6$ at a chemical shift of 0 ppm is used as a reference substance.

Phase correction is performed on the obtained $^1H$-NMR spectrum such that all the detected NMR signals are directed upward and inclinations at both bottoms are the same in all the NMR signals. Next, a line connecting points at 0 ppm and 8 ppm with a straight line is defined as a base line.

An integrated value having a start point and an end point at the points corresponding to ±0.05 ppm around the peak top of the NMR signal of the reference substance after the above correction is performed is defined as an integrated value I1 of the reference substance, and an integrated value of signal intensity at 3.4 ppm to 3.6 ppm is calculated as an integrated value I2 of the structure of Formula (1) originating from the compound A. The structure of Formula (1) is quantified in consideration of the molecular weights, the numbers of protons, and the concentrations of the reference substance and the structure of Formula (1).

Specifically, the content of the structure represented by Formula (1) is quantified on the basis of the following calculation equation.

$$\text{Content of structure represented by Formula (1)[ppm by mass]}=\{(M\times m)/(T\times w2/w1)\}\times(n1/n2)\times(I2/I1)\times 10^6$$

Note that the mass of the toner used for the elution is defined as T [g], the mass of methanol used for the elution is defined as w1 [mg], the mass of supernatant used for $^1H$-NMR is defined as w2 [mg], the mol number of the reference substance used for the analysis is defined as m [mol], the molecular weight of the structure of Formula (1) is defined as M [g/mol], the number of hydrogens in the component to which the focused peak of the reference substance belongs is defined as n1, and the number of hydrogens in the structure of Formula (1) is defined as n2.

Calculation of Surface Exposure Rate of Toner Particles

Method for Acquiring Backscattered Electron Image Backscattered by Surface of Toner The surface exposure rate of the toner particles is calculated by using an electron image backscattered by the surface of the toner. The electron image backscattered by the surface of the toner is acquired by a scanning electronic microscope (SEM). The backscattered electron image obtained from the SEM is also called a "composition image", which is detected as a darker image when the atom number is smaller and is detected as a brighter image when the atom number is larger.

The toner particles are typically resin particles mainly containing a composition that contains carbon as a main component, such as a resin component and a release agent.

In a case where silica fine particles and a metal oxide are present on the surfaces of the toner particles, the silica fine particles and the metal oxide are observed as bright parts while the surfaces of the toner particles are detected as dark parts in the backscattered electron image obtained from the SEM.

The apparatus and the observation condition of the SEM are as follows.

Used apparatus: ULTRA PLUS manufactured by Carl Zeiss Microscopy, LLC

Acceleration voltage 1.0 Kv

WD: 2.0 mm

Aperture Size: 30.0 μm

Detection signal: EsB (energy selection-type backscattered electron)

EsB Grid: 800 V

Observation magnification: 50,000 times

Contrast: 63.0±5.0% (reference value)

Brightness: 38.0±5.0% (reference value)

Image size: 1024×768 pixels

Pre-treatment: Diffusing the toner particles to a carbon tape (with no vapor deposition)

The contrast and the brightness are appropriately set in accordance with the state of the used apparatus. Also, the acceleration voltage and EsB Grid are set to achieve the items, such as acquisition of structure information of the frontmost surfaces of the toner particles, charge-up prevention of the un-deposited sample, and selective detection of backscattered electrons with high energy. As a field of view for the observation, a field of view near the vertex where the curvature of the toner particles is the smallest is selected.

Method for Checking that Dark Parts in Backscattered Electron Image Originates from Surfaces of Toner Particles The fact that the observed dark parts in the backscattered electron image originates from the surfaces of the toner particles is checked by superimposing an element mapping image based on energy dispersion-type X-ray analysis (EDS) acquired by a scanning electron microscope (SEM) with the above backscattered electron image.

The apparatuses and the observation condition for SEM/EDS are as follows.

Used apparatus (SEM): ULTRA PLUS manufactured by Carl Zeiss

Microscopy, LLC

Used apparatus (EDS): NORAN System 7, Ultra Dry EDS Detector manufactured by Thermo Fisher Scientific Acceleration voltage: 5.0 Kv WD: 7.0 mm Aperture Size: 30.0 μm Detection signal: SE2 (secondary electron)

Observation magnification: 50,000 TIMES

Mode: Spectral Imaging

Pre-treatment: Diffusing the toner particles to a carbon tape and perform platinum sputtering An element mapping image acquired by this method and the above backscattered electron image are superimposed with each other, and the fact that the carbon atom parts of the mapping image and the dark parts of the backscattered electron image coincide with each other is checked. The parts where the carbon atom parts of the mapping image and the dark parts of the backscattered electron image coincide with each other are defined as surfaces of the toner particles.

Method for Calculating Surface Exposure Rate

The surface exposure rate of the toner is calculated by using an image processing software ImageJ (developed by Wayne Rashand) from the backscattered electron image of the frontmost surfaces of the toner particles obtained by the above method. The procedure will be shown below.

First, the backscattered electron image as a target of analysis is converted into 8 bits from Type in the Image menu. Next, the Median diameter is set to 2.0 pixels from Filters in the Process menu to reduce image noise. An image center is estimated with an observation condition display part displayed below the backscattered electron image excluded, and a square range with a side of 1.5 μm is selected from the image center of the backscattered electron image by using a rectangle tool in the tool bar.

Net, only parts where the carbon atom parts of the mapping image and the dark parts of the backscattered electron image coincide with each other are selected by using the Freehand Selections function in the Image menu, and all the parts are painted with a black color. Also, all the parts other than the parts where the carbon atom parts of the mapping image and the dark parts of the backscattered electron image coincide with each other are painted with a white color. Next, Threshold is selected from Adjust. 128 which is center grayscale between black and white in the 8-bit image is selected as a threshold value by a manual operation, and Apply is clicked to obtain a binary image. Through this operation, pixels corresponding to the toner particles are displayed with a black color (pixel group A1), and pixels corresponding to the external additive and the like covering the surfaces of the toner particles are displayed with a white color (pixel group A2).

The image center is estimated with the observation condition display part displayed below the backscattered electron image excluded, and a square range with a side of 1.5 μm from the image center of the backscattered electron image is selected by using a rectangle tool in the tool bar.

Next, a scale bar in the observation condition display part displayed below the backscattered electron image is selected in advance by using a straight line tool in the tool bar. If Set Scale in the Analyze menu is selected in the state, a new window is opened, and a pixel distance of the selected straight line is input to the section of Distance in Pixels.

If the scale bar value (100, for example) is input to the section of Known Distance in the above window, a unit (nm, for example) of the scale bar is input to the section of Unit of Measurement, and OK is clicked, the scale setting is completed.

Subsequently, Set Measurement in the Analyze menu is selected, and Area and Feret's diameter are checked. If Analyze Particles in the Analyze menu is selected, Display Result is checked, and OK is clicked, then domain analysis is performed.

The areas of each of the domains corresponding to the non-covered portion domain D1 formed by the pixel group A1 and the covered portion domain D2 formed by the pixel group A2 is acquired from the newly opened Results window.

The sum of the areas of the non-covered portion domain D1 is defined as S1 ($\mu m^2$), and the sum of the areas of the covered portion domain D2 is defined as S2 ($\mu m^2$). The surface exposure rate S is calculated by the following equation from obtained S1 and S2.

$$S(\% \text{ by area})=\{S1/(S1+S2)\}\times 100$$

The above procedure is performed for ten field of view for the toner particles as evaluation target, and an arithmetic mean value is used as a surface exposure rate.

EXAMPLES

The present invention will be specifically described on the basis of manufacturing examples and examples described below. However, these are not intended to limit the present invention in any sense. Note that in a case where all the expressions "parts" and "%" in the prescriptions below are on the mass basis.

Method for Manufacturing Aliphatic Alcohol Alkylene Oxide Adduct 1

After 190 parts of lauryl alcohol and 0.06 parts of aluminum pechlorate nonahydrate were placed into an autoclave made of glass and having stirring and temperature adjusting functions, the inside of the mixing system was substituted with nitrogen, and dehydration was performed under a reduced pressure (about 20 mmHg) at 95° C. for 1 hour. Then, 90 parts of ethylene oxide (addition in a first stage) was introduced at 95° C. while setting the gauge pressure to 1 to 3 kgf/cm$^2$.

0.3 parts of potassium hydroxide was added to the adduct, and 220 parts (5 mol) of ethylene oxide (addition in a second stage) was introduced at 150° C. while setting the gauge pressure to 1 to 3 kgf/cm$^2$. 3 parts of "Kyowaad 600 (manufactured by Kyowa Chemical Industry Co., Ltd.)" was put into the reactant, adsorption treatment of the catalyst was performed at 90° C., and an aliphatic alcohol alkylene oxide adduct 1 was then obtained through filtration.

Method for Manufacturing Aliphatic Alcohol Alkylene Oxide Adducts 2 to 7

Aliphatic alcohol alkylene oxide adducts 2 to 7 were obtained similarly to the method for manufacturing the aliphatic alcohol alkylene oxide adduct 1 other than that the types of used aliphatic alcohol, the number of parts of aliphatic alcohol, and the number of parts of ethylene oxide were changed as shown in Table 1.

Note that in each manufacturing method, ethylene oxide was added such that proportions thereof in the addition in the first stage and the addition in the second stage were similar to those in the method for manufacturing the aliphatic alcohol alkylene oxide adduct 1 on the mass basis.

perature, and an ion-exchanged water was added thereto, thereby obtaining a resin particle dispersion 1 with solid content concentration of 12.5% by mass and with a median diameter of 0.2 μm on the volume basis.

Preparation of Resin Particle Dispersions 2 to 13

Resin particle dispersions 2 to 13 were obtained similarly to the preparation of the resin particle dispersion 1 other than that the types and the amounts of the compound A and the compound B were set as shown in Table 2. The used compounds are shown in Table 2.

Note that RLM-100NV manufactured by Kao Corporation was used as sodium polyoxyethylene lurylether acetate in Table 2, a product of a product number: 37202-11 manufactured by Kanto Chemical Co., Inc. was used as branched sodium dodecylbenzene sulfonate (branched sodium alkylbenzene sulfonate), and a product of a product number: 37275-01 manufactured by Kanto Chemical Co., Inc. was used as sodium stearate.

Preparation of Resin Particle Dispersion 14

Monomers serving as acid components and alcohol components were introduced into a reaction vessel provided with a nitrogen introducing tube, dehydrating tube, a stirrer, and a thermocouple to achieve the following molar ratios.

Terephthalic acid: 40.0

Isopropyl acrylate: 3.0

Trimellitic anhydride: 6.0

2 mol adduct of propylene oxide of bisphenol A: 30.0

2 mol adduct of ethylene oxide of bisphenol A: 10.0

Ethylene glycol: 6.0

As a catalyst, 1.5 parts of dibutyltin was added with respect to 100 parts of the total amount of monomers. Then, the temperature was quickly raised to 180° C. under a normal pressure in a nitrogen atmosphere, water was distilled off while heating was performed at a speed of 10° C./hour from 180° C. to 210° C., and condensation polymerization was performed. After the temperature reached 210° C., the pressure inside the reaction vessel was reduced to not more than 5 kPa, and condensation polymerization was performed under conditions of 210° C. and not more than 5 kPa, thereby obtaining a polyester resin 1. At that time, the polymerization time was adjusted such that the softening point of the thus obtained polyester resin 1 was 126° C.

TABLE 1

| | Aliphatic alcohol type | Number of parts of aliphatic alcohol [parts] | Number of parts of ethylene oxide [parts] |
|---|---|---|---|
| Aliphatic alcohol alkylene oxide adduct 1 | Lauryl alcohol | 190 | 310 |
| Aliphatic alcohol alkylene oxide adduct 2 | Lauryl alcohol | 190 | 440 |
| Aliphatic alcohol alkylene oxide adduct 3 | Lauryl alcohol | 190 | 840 |
| Aliphatic alcohol alkylene oxide adduct 4 | Lauryl alcohol | 190 | 130 |
| Aliphatic alcohol alkylene oxide adduct 5 | Lauryl alcohol | 190 | 620 |
| Aliphatic alcohol alkylene oxide adduct 6 | Lauryl alcohol | 190 | 90 |
| Aliphatic alcohol alkylene oxide adduct 7 | Lauryl alcohol | 190 | 900 |

Preparation of Resin Particle Dispersion 1

78.0 parts of styrene, 20.7 parts of butyl acrylate, 1.3 parts of acrylic acid as a carboxy group imparting monomer, and 3.2 parts of n-lauryl mercaptan were mixed and dissolved. The full amount of aqueous solution obtained by dissolving 1.0 parts of aliphatic alcohol alkylene oxide adduct as a compound A and 1.5 parts of linear sodium alkylbenzene sulfonate (linear sodium dodecylbenzene sulfonate) (product name: Neogen RK (manufactured by DKS Co., Ltd.)) as a compound B in 150 parts of ion-exchanged water was added to and dispersed in the above solution.

Further, an aqueous solution of 0.3 parts of potassium persulfate and 10 parts of ion-exchanged water was added thereto while the solution was slowly stirred for 10 minutes. After nitrogen substitution, emulsion polymerization was performed at 70° C. for 6 hours. After the polymerization ended, the reaction solution was cooled to the room tem- 100.0 parts of polyester resin 1 and 350 parts of ion-exchanged water were placed in a container made of stainless steel and were heated to 95° C. in a warm bath and were dissolved. Thereafter, 0.1 mol/L sodium hydrogen carbonate was added thereto while the solution was sufficiently stirred at 7800 rpm by using a homogenizer (manufactured by IKA: ULTRA-TURRAX T50) to achieve pH exceeding 7.0.

Thereafter, a mixture solution of 3.0 parts of linear sodium alkylbenzene sulfonate and 300 parts of ion-exchanged water was gradually dripped, and emulsion dispersion was caused, thereby obtaining a polyester resin particle dispersion. The dispersion was cooled to the room temperature, and ion-exchanged water was added thereto, thereby obtaining a resin particle dispersion 14 with a solid content concentration of 12.5% by mass and with a median diameter of 0.2 μm on the volume basis.

TABLE 2

| Resin particle dispersion No. | Compound A type | Compound A [parts] | Compound B type | Compound B (parts] |
|---|---|---|---|---|
| 1 | Aliphatic alcohol alkylene oxide adduct 1 | 1.0 | Linear sodium alkylbenzene sulfonate | 1.5 |
| 2 | Aliphatic alcohol alkylene oxide adduct 2 | 0.8 | Linear sodium alkylbenzene sulfonate | 1.5 |
| 3 | Aliphatic alcohol alkylene oxide adduct 3 | 0.5 | Linear sodium alkylbenzene sulfonate | 1.5 |
| 4 | Aliphatic alcohol alkylene oxide adduct 4 | 3.0 | Linear sodium alkylbenzene sulfonate | 1.5 |
| 5 | Aliphatic alcohol alkylene oxide adduct 5 | 0.6 | Linear sodium alkylbenzene sulfonate | 1.5 |
| 6 | Aliphatic alcohol alkylene oxide adduct 6 | 4.5 | Linear sodium alkylbenzene sulfonate | 1.5 |
| 7 | Aliphatic alcohol alkylene oxide adduct 7 | 0.5 | Linear sodium alkylbenzene sulfonate | 1.5 |
| 8 | Aliphatic alcohol alkylene oxide adduct 1 | 1.0 | Branched sodium dodecylbenzene sulfonate | 1.5 |
| 9 | Aliphatic alcohol alkylene oxide adduct 1 | 1.0 | Sodium stearate | 1.2 |
| 10 | Sodium polyoxyetylene lauryl ether acetate | 3.0 | Linear sodium alkylbenzene sulfonate | 1.5 |
| 11 | Aliphatic alcohol alkylene oxide adduct 1 | 2.0 | — | — |
| 12 | Aliphatic alcohol alkylene oxide adduct 2 | 1.8 | — | — |
| 13 | — | — | Linear sodium alkylbenzene sulfonate | 3.0 |
| 14 | — | — | Linear sodium alkylbenzene sulfonate | 3.0 |

Preparation of Release Agent Dispersion 1

100 parts of release agent (behenyl behenate, melting point: 72.1° C.) and 15 parts of aliphatic alcohol alkylene oxide adduct 1 were mixed with 385 parts of ion-exchanged water and were dispersed therein for about 1 hour by using a wet jet mill JN100 (manufactured by Jokoh Co., Ltd.), thereby obtaining a release agent dispersion. The concentration of the release agent dispersion was 20% by mass.

Preparation of Release Agent Dispersion 2

A release agent dispersion 2 was obtained similarly to the preparation of the release agent dispersion 1 other than that the aliphatic alcohol alkylene oxide adduct 1 was changed to linear sodium alkylbenzene sulfonate in the preparation of the release agent dispersion 1.

Preparation of Release Agent Dispersion 3

A release agent dispersion 3 was obtained similarly to the preparation of the release agent dispersion 2 other than that 100 parts of release agent (behenyl behenate, melting point: 72.1° C.) was changed to 25 parts of release agent (hydrocarbon wax, melting point: 79° C.) and 70 parts of plasticizer (ethylene glycol distearate) in the preparation of the release agent dispersion 2.

Preparation of Colorant Dispersion 1

100 parts of carbon black "Nipex 35 (manufactured by Orion Engineered Carbons) as a colorant and 15 parts of aliphatic alcohol alkylene oxide adduct 1 were mixed with 885 parts of ion-exchanged water and was dispersed for about 1 hour by using a wet jet mill JN100, thereby obtaining a colorant dispersion.

Preparation of Colorant Dispersion 2

A colorant dispersion 2 was obtained similarly to the preparation of the colorant dispersion 1 other than that the aliphatic alcohol alkylene oxide adduct 1 was changed to linear sodium alkylbenzene sulfonate in the preparation of the colorant dispersion 1.

Preparation of Magnetic Material Dispersion 1

55 liters of 4.0 mol/L sodium hydroxide aqueous solution was mixed and stirred with 50 liters of iron (I) sulfate aqueous solution containing 2.0 mol/L of $Fe^{2+}$, thereby obtaining an iron (I) salt aqueous solution containing an iron (I) hydroxide. The aqueous solution was maintained at 85° C., and an oxidation reaction was performed for 2 hours by blowing air thereinto at 20 L/min, thereby obtaining a slurry containing core particles.

The thus obtained slurry was filtrated through a filter press and was washed, and the core particles were then dispersed again in water. Sodium silicate in the amount of 0.20% by mass in terms of silicon per 100 parts of core particles was added to the obtained re-slurry solution to adjust pH of the slurry solution to 6.0, and the solution was stirred, thereby obtaining magnetic iron oxide particles with silicon-rich surface.

The thus obtained slurry solution was filtrated with a filter press and was washed, and re-slurry was further performed with ion-exchanged water. 500 parts (10% by mass with respect to the magnetic iron oxide) of ion-exchanged resin SK110 (manufactured by Mitsubishi Chemical Corporation) was added to the re-slurry solution (solid content of 50 parts/L), and the mixture was stirred for 2 hours to perform ion exchange. Thereafter, the ion-exchanged resin was filtrated and removed with a mesh, was filtrated and washed with a filter press, and was dried and shredded, thereby obtaining a magnetic material 1 with a primary particle number average particle diameter of 0.21 μm.

A magnetic material dispersion 1 using the magnetic material 1 as a colorant was obtained similarly to the preparation of the colorant dispersion 1 other than that the carbon black was changed to 300 parts of magnetic material 1 in the preparation of the colorant dispersion 1.

Production Example of Toner Particles 1

Dispersion Process 265 parts of resin particle dispersion 1, 10 parts of release agent dispersion 1, 10 parts of colorant dispersion 1, 2.9 parts of aliphatic alcohol alkylene oxide adduct 1, and 0.6 parts of linear sodium alkylbenzene sulfonate (Neogen RK) were dispersed by using a homogenizer (manufactured by IKA: ULTRA TURRUX T50). The temperature inside the container was adjusted to 30° C. while the mixture was stirred, 1 mol/L of sodium hydroxide aqueous solution was added thereto, and adjustment to pH=8.0 was performed.

Aggregation Process

An aqueous solution obtained by dissolving 0.08 parts of aluminum chloride as a coagulant in 10 parts of ion-exchanged water was added thereto for 10 minutes under stirring at 30° C. The mixture was left for 3 minutes, and a temperature rising was caused to start, the temperature was raised up to 50° C., thereby generating associated particles. In that state, the particle sizes of the associated particles were measured by a "Coulter Counter Multisizer 3" (registered trademark, manufactured by Beckman Coulter Inc.). 0.9 parts of sodium chloride and 5.0 parts of aliphatic alcohol were added thereto to stop the particle growth at the timing when the weight average particle diameter became 7.0 μm.

1 mol/L of sodium hydroxide aqueous solution was added to perform adjustment to achieve pH=9.0, the temperature was raised to 95° C., and the aggregated particles were spheroidized. Temperature dropping was caused to start when the average circularity reached 0.980, and the particles were cooled to the room temperature, thereby obtaining a toner particle dispersion 1.

Washing Process

A hydrochloric acid was added to the thus obtained toner particle dispersion 1 to perform adjustment to achieve pH=1.5 or less, the mixture was stirred and left for 1 hour and was subjected to solid-liquid separation with a pressure filter, thereby obtaining a toner cake. A re-slurry was obtained from this with ion-exchanged water to form a dispersion again, and the dispersion was subjected to solid-liquid separation with the aforementioned filter. The re-slurry and the solid-liquid separation were repeated until the electric conductivity of the filtrate became not more than 5.0 μS/cm, and solid-liquid separation was finally performed, thereby obtaining a toner cake. The thus obtained toner cake was dried and was further classified by using a classifier, thereby obtaining toner particles 1. The primary particle number average particle diameter of the toner particles 1 was 6.5 μm.

Production Examples of Toner Particles 2 to 24

Toner particles 2 to 24 were obtained similarly to the production example of the toner particles 1 other than that the types and the amounts of the resin particle dispersion, the release agent dispersion, the colorant dispersion, and the compound A and the compound B to be added in the dispersion process were changed as shown in Tables 3-1 and 3-2 in the production example of the toner particles 1.

TABLE 3-1

| Toner particle No. | Resin particle dispersion | Release agent dispersion | Colorant dispersion |
|---|---|---|---|
| 1 | Resin particle dispersion 1 | Release agent dispersion 1 | Colorant dispersion 1 |
| 2 | Resin particle dispersion 2 | Release agent dispersion 1 | Colorant dispersion 1 |
| 3 | Resin particle dispersion 11 | Release agent dispersion 1 | Colorant dispersion 1 |
| 4 | Resin particle dispersion 12 | Release agent dispersion 1 | Colorant dispersion 1 |
| 5 | Resin particle dispersion 3 | Release agent dispersion 1 | Colorant dispersion 1 |
| 6 | Resin particle dispersion 4 | Release agent dispersion 1 | Colorant dispersion 1 |
| 7 | Resin particle dispersion 8 | Release agent dispersion 1 | Colorant dispersion 1 |
| 8 | Resin particle dispersion 9 | Release agent dispersion 1 | Colorant dispersion 1 |
| 9 | Resin particle dispersion 5 | Release agent dispersion 1 | Colorant dispersion 1 |
| 10 | Resin particle dispersion 5 | Release agent dispersion 1 | Colorant dispersion 1 |
| 11 | Resin particle dispersion 2 | Release agent dispersion 1 | Colorant dispersion 1 |
| 12 | Resin particle dispersion 2 | Release agent dispersion 1 | Colorant dispersion 1 |
| 13 | Resin particle dispersion 2 | Release agent dispersion 1 | Colorant dispersion 1 |
| 14 | Resin particle dispersion 2 | Release agent dispersion 1 | Colorant dispersion 1 |
| 15 | Resin particle dispersion 1 | Release agent dispersion 1 | Colorant dispersion 1 |
| 16 | Resin particle dispersion 1 | Release agent dispersion 1 | Colorant dispersion 1 |
| 17 | Resin particle dispersion 10 | Release agent dispersion 1 | Colorant dispersion 1 |
| 18 | Resin particle dispersion 2 | Release agent dispersion 1 | Magnetic body dispersion 1 |
| 19 | Resin particle dispersion 14 | Release agent dispersion 1 | Colorant dispersion 1 |
| 20 | Resin particle dispersion 13 | Release agent dispersion 2 | Colorant dispersion 2 |
| 21 | Resin particle dispersion 6 | Release agent dispersion 1 | Colorant dispersion 1 |
| 22 | Resin particle dispersion 7 | Release agent dispersion 1 | Colorant dispersion 1 |
| 23 | Resin particle dispersion 14 | Release agent dispersion 2 | Colorant dispersion 2 |
| 24 | Resin particle dispersion 13 | Release agent dispersion 3 | Colorant dispersion 2 |

TABLE 3-2

| Toner particle | Compound A | | Compound B | | Colorant |
|---|---|---|---|---|---|
| No. | Compound A type | [Parts] | Compound B type | [Parts] | |
| 1 | Aliphatic alcohol alkylene oxide adduct 1 | 2.9 | Linear sodium alkylbenzene sulfonate | 0.6 | Carbon black |
| 2 | Aliphatic alcohol alkylene oxide adduct 2 | 1.0 | Linear sodium alkylbenzene sulfonate | 2.6 | Carbon black |
| 3 | Aliphatic alcohol alkylene oxide adduct 1 | 3.7 | — | — | Carbon black |
| 4 | Aliphatic alcohol alkylene oxide adduct 2 | 1.2 | — | — | Carbon black |
| 5 | Aliphatic alcohol alkylene oxide adduct 3 | 3.7 | Linear sodium alkylbenzene sulfonate | 0.6 | Carbon black |
| 6 | Aliphatic alcohol alkylene oxide adduct 4 | 1.1 | Linear sodium alkylbenzene sulfonate | 0.6 | Carbon black |
| 7 | Aliphatic alcohol alkylene oxide adduct 1 | 3.4 | Branched sodium dodecylbenzene sulfonate | 0.6 | Carbon black |
| 8 | Aliphatic alcohol alkylene oxide adduct 1 | 3.4 | Sodium stearate | 2.8 | Carbon black |
| 9 | Aliphatic alcohol alkylene oxide adduct 5 | 4.3 | Linear sodium alkylbenzene sulfonate | 0.6 | Carbon black |
| 10 | Aliphatic alcohol alkylene oxide adduct 5 | 4.3 | Linear sodium alkylbenzene sulfonate | 0.6 | Carbon black |
| 11 | Aliphatic alcohol alkylene oxide adduct 2 | 0.4 | Linear sodium alkylbenzene sulfonate | 0.6 | Carbon black |
| 12 | Aliphatic alcohol alkylene oxide adduct 2 | 0.2 | Linear sodium alkylbenzene sulfonate | 0.6 | Carbon black |
| 13 | Aliphatic alcohol alkylene oxide adduct 2 | 0.8 | Linear sodium alkylbenzene sulfonate | 5.9 | Carbon black |
| 14 | Aliphatic alcohol alkylene oxide adduct 2 | 1.0 | Linear sodium alkylbenzene sulfonate | 5.6 | Carbon black |
| 15 | Aliphatic alcohol alkylene oxide adduct 1 | 2.9 | — | — | Carbon black |
| 16 | Aliphatic alcohol alkylene oxide adduct 1 | 2.9 | — | — | Carbon black |
| 17 | Sodium polyoxyethylene lauryl ether acetate | 3.4 | Linear sodium alkylbenzene sulfonate | 0.6 | Carbon black |

TABLE 3-2-continued

| Toner particle No. | Compound A: Compound A type | Compound A: [Parts] | Compound B: Compound B type | Compound B: [Parts] | Colorant |
|---|---|---|---|---|---|
| 18 | Aliphatic alcohol alkylene oxide adduct 2 | 1.0 | Linear sodium alkylbenzene sulfonate | 2.6 | Magnetic body |
| 19 | Aliphatic alcohol alkylene oxide adduct 2 | 1.0 | Linear sodium alkylbenzene sulfonate | 1.6 | Carbon black |
| 20 | — | — | Linear sodium alkylbenzene sulfonate | 1.6 | Carbon black |
| 21 | Aliphatic alcohol alkylene oxide adduct 6 | 0.6 | Linear sodium alkylbenzene sulfonate | 0.6 | Carbon black |
| 22 | Aliphatic alcohol alkylene oxide adduct 7 | 3.8 | Linear sodium alkylbenzene sulfonate | 0.6 | Carbon black |
| 23 | — | — | Linear sodium alkylbenzene sulfonate | 1.6 | Carbon black |
| 24 | — | — | Linear sodium alkylbenzene sulfonate | 1.6 | Carbon black |

Production Example of Toner 1

External Addition Process 0.5 parts of silica fine particles (RY300: manufactured by Nippon Aerosil Co., Ltd.) as an external additive with respect to the obtained toner particles 1 (100.00 parts) described above was put into an FM mixer (FM10C type manufactured by Nippon Coke & Engineering Co., Ltd.) with a jacket in which water at 7° C. was caused to pass through.

After the water temperature inside the jacket became stable at 7° C.±1° C., the mixture was mixed at a circumferential speed of 38 in/sec with a rotating vane for 5 minutes, thereby obtaining a toner mixture 1.

At this time, the amount of water caused to pass through the inside of the jacket was appropriately adjusted such that the temperature inside the vessel of the FM mixer did not exceed 25° C.

The thus obtained toner mixture 1 was filtered by a mesh with an opening of 75 μm, thereby obtaining a toner 1. The surface exposure rate of the obtained toner 1 was 64%. Manufacturing conditions and toner physical properties of the toner 1 are shown in Table 4.

Production Examples of Toners 2 to 26

Toners 2 to 26 were obtained similarly to the manufacturing example of the toner 1 other than that the types of the toner particles and the numbers of parts of the external additive were changed to the conditions shown in Table 4 in the manufacturing example of the toner 1. Toner physical properties are shown in Table 4.

TABLE 4

| Toner No | Toner particle No. | External additive | External additive [parts] | Surface exposure rate [%] | Average m/z | P value | (1) Content (ppm) | Presence of peak with m/z = 325 in M/S measurement | Presence of peak with m/z = 183 or 197 in MS/MS measurement | N value | P/N ratio |
|---|---|---|---|---|---|---|---|---|---|---|---|
| 1 | 1 | Hydrophobic silica | 0.5 | 64 | 542 | 992068 | 976 | Present | Present | 1071553 | 0.93 |
| 2 | 2 | Hydrophobic silica | 0.7 | 57 | 680 | 618547 | 284 | Present | Present | 1702341 | 0.36 |
| 3 | 3 | Hydrophobic silica | 0.5 | 64 | 563 | 1216920 | 1108 | Not present | Not present | — | — |
| 4 | 4 | Hydrophobic silica | 0.5 | 64 | 637 | 923519 | 903 | Not present | Not present | — | — |
| 5 | 5 | Hydrophobic silica | 0.5 | 64 | 987 | 543171 | 792 | Present | Present | 1034679 | 0.52 |
| 6 | 6 | Hydrophobic silica | 0.5 | 64 | 308 | 411025 | 78 | Present | Present | 1113059 | 0.37 |
| 7 | 7 | Hydrophobic silica | 0.5 | 64 | 563 | 929885 | 918 | Present | Present | 1472911 | 0.63 |
| 8 | 8 | Hydrophobic silica | 0.5 | 64 | 542 | 991368 | 988 | Not present | Not present | 1190032 | 0.83 |
| 9 | 9 | Hydrophobic silica | 0.5 | 65 | 778 | 1410717 | 1507 | Present | Present | 2003191 | 0.70 |
| 10 | 10 | Hydrophobic silica | 0.5 | 63 | 739 | 1319221 | 1411 | Present | Present | 1974736 | 0.67 |
| 11 | 11 | Hydrophobic silica | 0.5 | 64 | 679 | 393213 | 57 | Present | Present | 510322 | 0.77 |
| 12 | 12 | Hydrophobic silica | 0.5 | 64 | 680 | 341623 | 28 | Present | Present | 426911 | 0.80 |
| 13 | 13 | Hydrophobic silica | 0.5 | 64 | 636 | 698391 | 360 | Present | Present | 3952873 | 0.18 |
| 14 | 14 | Hydrophobic silica | 0.5 | 64 | 680 | 621554 | 301 | Present | Present | 3016299 | 0.21 |
| 15 | 15 | Hydrophobic silica | 0.5 | 64 | 563 | 989313 | 959 | Present | Present | 498371 | 1.99 |
| 16 | 16 | Hydrophobic silica | 0.5 | 64 | 563 | 913295 | 891 | Present | Present | 446235 | 2.05 |
| 17 | 17 | Hydrophobic silica | 0.5 | 64 | 644 | 1053742 | 1052 | Present | Present | 1151318 | 0.92 |
| 18 | 2 | Hydrophobic silica | 0.9 | 51 | 680 | 585461 | 399 | Present | Present | 1696931 | 0.35 |
| 19 | 2 | Hydrophobic silica | 1.0 | 48 | 680 | 635742 | 291 | Present | Present | 1751117 | 0.36 |
| 20 | 18 | Hydrophobic silica | 0.5 | 64 | 681 | 615922 | 277 | Present | Present | 1746814 | 0.35 |
| 21 | 19 | Hydrophobic silica | 0.7 | 57 | 680 | 618639 | 288 | Present | Present | 1713695 | 0.36 |
| 22 | 20 | Hydrophobic silica | 0.5 | 64 | — | — | — | Present | Present | 3914599 | — |
| 23 | 21 | Hydrophobic silica | 0.5 | 64 | 264 | 501969 | 53 | Present | Present | 1071553 | 0.47 |
| 24 | 22 | Hydrophobic silica | 0.5 | 64 | 1073 | 550207 | 502 | Present | Present | 1472911 | 0.37 |
| 25 | 23 | Hydrophobic silica | 0.5 | 64 | — | — | — | Present | Present | 3914599 | — |
| 26 | 24 | Hydrophobic silica | 0.5 | 64 | — | — | — | Present | Present | 3996315 | — |

In the toners 1 to 21, 23, and 24, reference peaks were present in mass analysis spectra.

Also, in the toners 1 to 21, 23, and 24, the compound A was detected in the ionized form as a cation in the analysis under the analysis condition A. In the toners 1, 2, and 5 to 26, the compound B was detected in the ionized form as anion in the analysis under the analysis condition A.

In the table, (1) Content [ppm] is a containing proportion (mass ppm) of the structure represented by Formula (1) contained in the compound A on the basis of the mass of the toner.

Production Examples of Cartridges One, Two and Three

Cartridges One, Two and Three were produced by changing supply power sources as in Table 5 such that it was possible to independently apply voltages to be applied to supply rollers, regulating members, and developing rollers of the process cartridges.

In regard to the process cartridge One, the supply power sources to be applied to the supply roller and the regulating member are the same, and only the supply power source for the developing roller is different as described above in the first embodiment.

In regard to the process cartridge Two, the supply power sources to be applied to the supply roller, the regulating member, and the developing roller are the same as described above in the first embodiment.

In regard to the process cartridge Three, the supply power sources to be applied to the supply roller, the regulating member, and the developing roller are different. More specifically, the process cartridge Three is a process cartridge in a comparative example in which voltages are supplied to the supply roller 32 and the regulating blade 33 from different power sources.

Figure 9A:
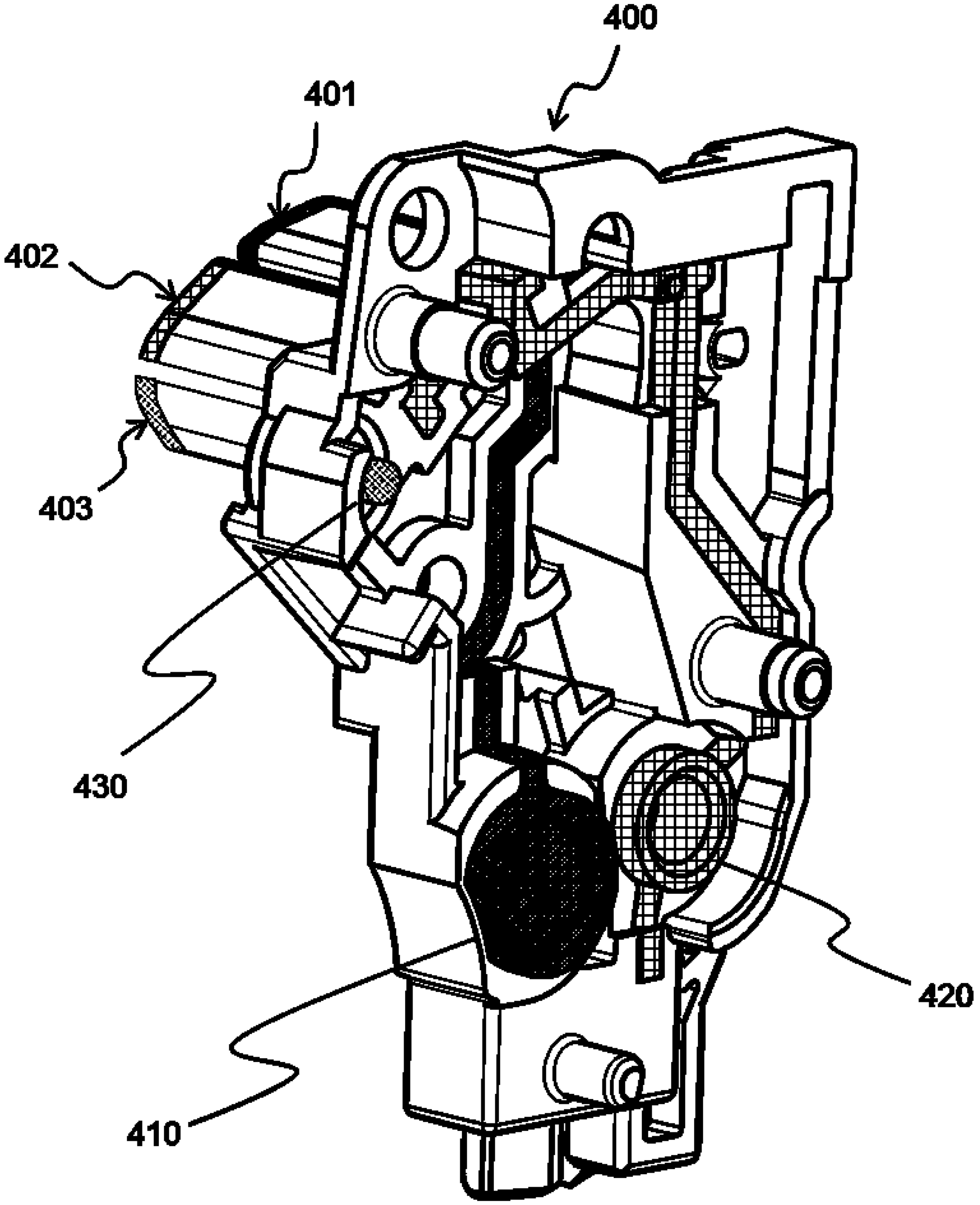
FIG. 9A is an example of a voltage supply component.
Figure 9B:
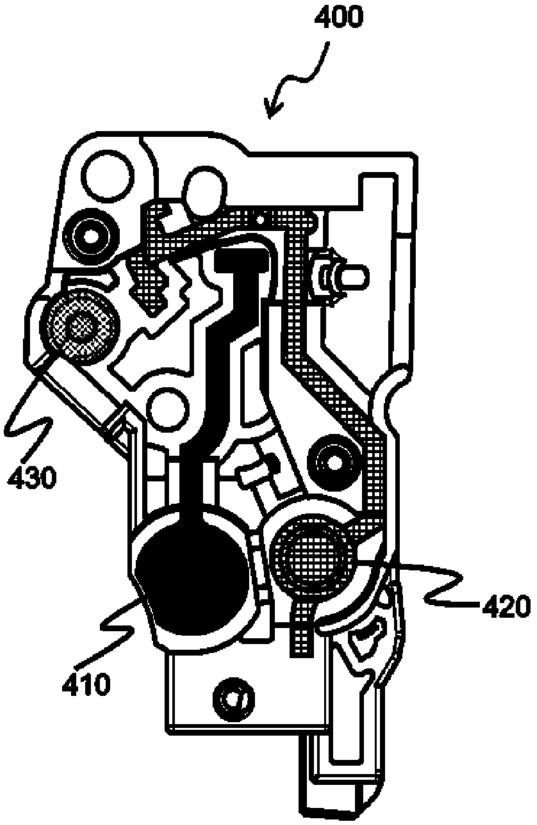
FIGS. 9B and 9C are an example of the voltage supply component.
Figure 9C:
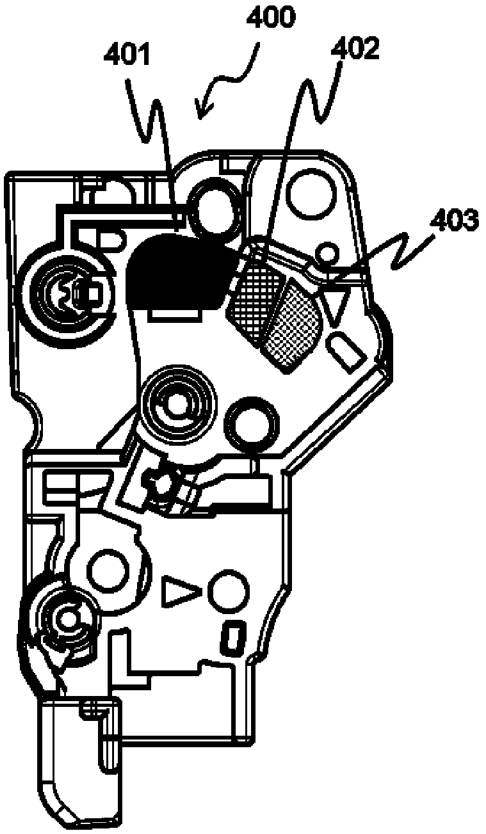
Figure 10:
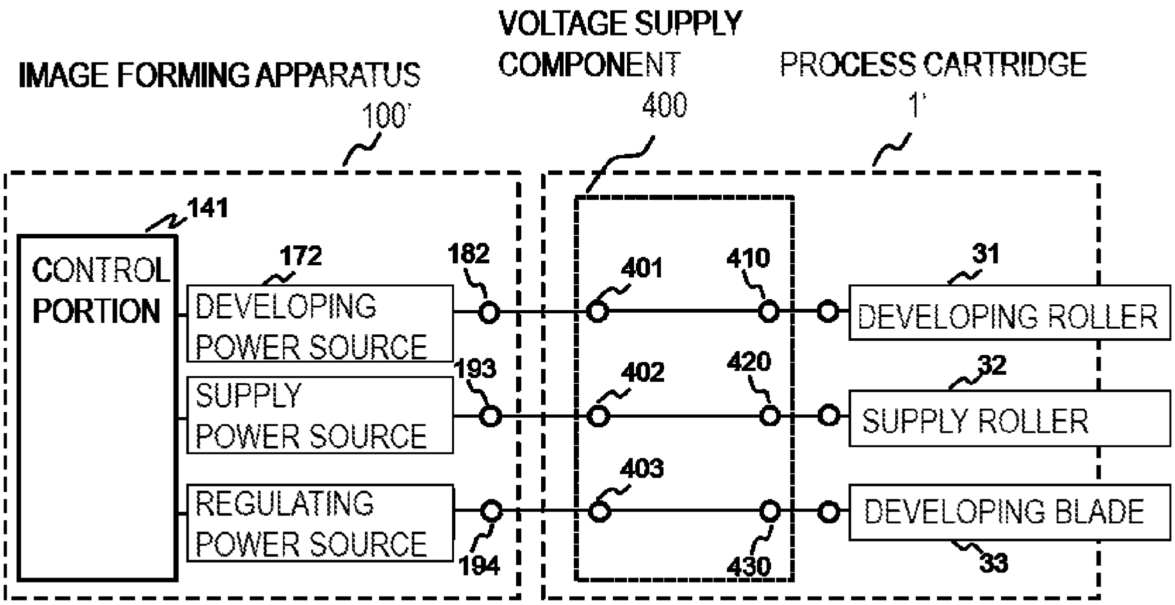
FIG. 10 is an example of a circuit diagram.

A case where voltages with a potential difference of −100 V with respect to the voltage to be applied to the developing roller 31 are applied as setting voltages to the supply roller 32 and the regulating blade 33 in the configuration of the process cartridge Three will be described. FIGS. 9A, 9B, and 9C are a perspective view (FIG. 9A), a front view (FIG. 9B), and a back view (FIG. 9C) of a voltage supply component 400 accompanying the developing device 2 in the process cartridge 3. FIG. 10 is a circuit diagram when the process cartridge Three is attached.

The process cartridge Three in the comparative example is attached to an image forming apparatus 100' including two power sources (173, 174) for supplying voltages to the supply roller 32 and the regulating blade 33. The developing power source 172 and the developing voltage main body contact point 182 have the same configurations as those in FIGS. 4A, 4B, and 4C.

The process cartridge Three comprises a supply voltage main body contact point 193 and a regulating voltage main body contact point 194 to individually supply voltages to the supply roller 32 and the regulating blade 33. Once the process cartridge Three is attached to the image forming apparatus 100', conduction is established as follows. A supply voltage contact point 402 and a regulating blade voltage contact point 403 that are contact points disposed in the voltage supply component 400 accompanying the process cartridge Three and the supply voltage main body contact point 193 and the regulating voltage main body contact point 194 disposed in the image forming apparatus 100' come into contact with each other and establish conduction, respectively.

The supply voltage contact point 402 is formed of an electrically conductive resin inside the voltage supply component 400, conduction of the supply roller holding portion 420 is established from the supply voltage contact point 402 (the hatched parts in FIGS. 9A, 9B, and 9C), and a voltage is supplied to the supply roller 32.

Similarly, the regulating blade voltage contact point 403 establishes conduction with the regulating blade contact point 430 that is in contact with the regulating blade 33 inside the voltage supply component 400 (the black parts in FIGS. 9A, 9B, and 9C), and a voltage is supplied to the regulating blade 33. The developing voltage contact point 401 establishes conduction with the developing roller holding portion 410 similarly to FIG. 3 and supplies a voltage to the developing roller 31.

Since the developing voltage contact point 401, the supply voltage contact point 402, and the developing blade voltage contact point 403 are insulated from each other, it is possible to individually apply each power source output voltage of the image forming apparatus 100'. The other configurations of the image forming apparatus 100' are similar to those in the image forming apparatus 100.

TABLE 5

| | CRG configuration | | |
|---|---|---|---|
| | Power source that applies voltage to supply member | Power source that applies voltage to regulating member | Power source that applies voltage to developing roller |
| Cartridge One | Supply/regulating power source | Supply/regulating power source | Developing power source |
| Cartridge Two | Supply/regulating power source | Supply/regulating power source | Supply/regulating power source |
| Cartridge Three | Supply power source | Regulating power source | Developing power source |

Production Example of Image Forming Apparatuses 100, 100', and 200

Image forming apparatuses 100 and 100' that were laser printers capable of forming monochrome images by using the electrophotographic scheme described above in the first embodiment were prepared as image forming apparatuses used in examples.

Also, an image forming apparatus 200 was prepared as a tandem-type full-color laser printer that was capable of forming full-color images by using the electrophotographic scheme and employed the intermediate transfer scheme. FIG. 11 is an overview sectional diagram of the image forming apparatus 200 in this example.

The image forming apparatus 200 in this example includes four image forming portions PY, PM, PC, and PK for forming images of yellow (Y), magenta (M), cyan (C), and black (K), respectively. Elements having the same or corresponding functions or configurations of the image forming portions PY, PM, PC, and PK may be collectively described by omitting Y, M, C, and K at ends of signs that indicate which of the colors the elements are for.

The image forming portion P comprises the process cartridge 1 in an attachable/detachable manner. Four process cartridges 1Y, 1M, 1C, and 1K accommodate toners of different colors that are three primary colors, yellow (Y), magenta (M), and cyan (C) plus black (K). Configurations and operations of the process cartridge 1 in this example are similar to the configurations and the operations of the process cartridge 1 described above in the first embodiment. The process cartridge 1 comprises a photosensitive member 11, a charging roller 21, and a developing device 2.

Also, the image forming portion P comprises a primary transfer roller 211 that is a roller-type primary transfer member serving as a primary transfer mechanism. In addition, the image forming apparatus 200 includes an exposure device 131 configured as one unit for exposing the photosensitive member 11 of each of the four image forming portions PY, PM, PC, and PK in this example.

An intermediate transfer belt 213 configured of an endless belt that is rotatable and serves as an intermediate transfer member is disposed to face the photosensitive member 11 of each image forming portion P. The intermediate transfer belt 213 is stretched over a driving roller 214 and a tension roller 215 serving as a plurality of bridging rollers (support rollers) and is bridged therebetween with a predetermined tension imparted thereto. The intermediate transfer belt 213 is rotated (rotating movement) by the driving roller 214 being driven and rotated by a driving force transmitted from a belt driving motor (not illustrated) serving as a driving source that configures a driving mechanism.

The aforementioned primary transfer roller 211 is disposed on the inner circumferential surface side of the intermediate transfer belt 213 to correspond to the photosensitive member 11 of each image forming portion P. The primary transfer roller 211 pressurizes the intermediate transfer belt 213 against the photosensitive member 11 and forms a primary transfer portion (primary transfer nip) N3 that is a contact portion between the photosensitive member 11 and the intermediate transfer belt 213.

Also, a secondary transfer roller 212 that is a roller-type secondary transfer member serving as a secondary transfer mechanism is disposed at a position where it faces the driving roller 214 that also serves as a secondary transfer facing roller on the outer circumferential surface side of the intermediate transfer belt 213. The secondary transfer roller 212 abuts the driving roller 214 via the intermediate transfer belt 213 and forms a secondary transfer portion (secondary transfer nip) N4 that is a contact portion between the intermediate transfer belt 213 and the secondary transfer roller 212.

At the time of forming of a full-color image, the toner of each of the colors Y, M, C, and K formed on each photosensitive member 11 is successively transferred (primarily transferred) by each primary transfer portion N3 such that it overlaps on the rotating intermediate transfer belt 213 due to an action of each primary transfer roller 213. The toner image formed on the intermediate transfer belt 213 is transferred (secondarily transferred) onto a recording material R transported by being sandwiched between the intermediate transfer belt 213 and the secondary transfer roller 212 by the secondary transfer portion N4 due to an action of the secondary transfer roller 212. The recording material R is transported from a sheet supply portion 181 to the secondary transfer portion N4 by matching timings with the toner image on the intermediate transfer belt 213.

Also, the image forming apparatus 200 is roughly divided into a system for 1Y, 1M, and 1C and a system for 1K in regard to the image forming operation in this example. This is for addressing monochrome printing, and the image forming operation is executed only by PK at the time of the monochrome printing. At the time of the monochrome printing, the developing unit of only 1K comes into contact with the photosensitive drum, and 1Y, 1M, and 1C are in a separated state. Such a configuration curbs unnecessary consumption of 1Y, 1M, and 1C that do not contribute to the image formation.

Figure 12:
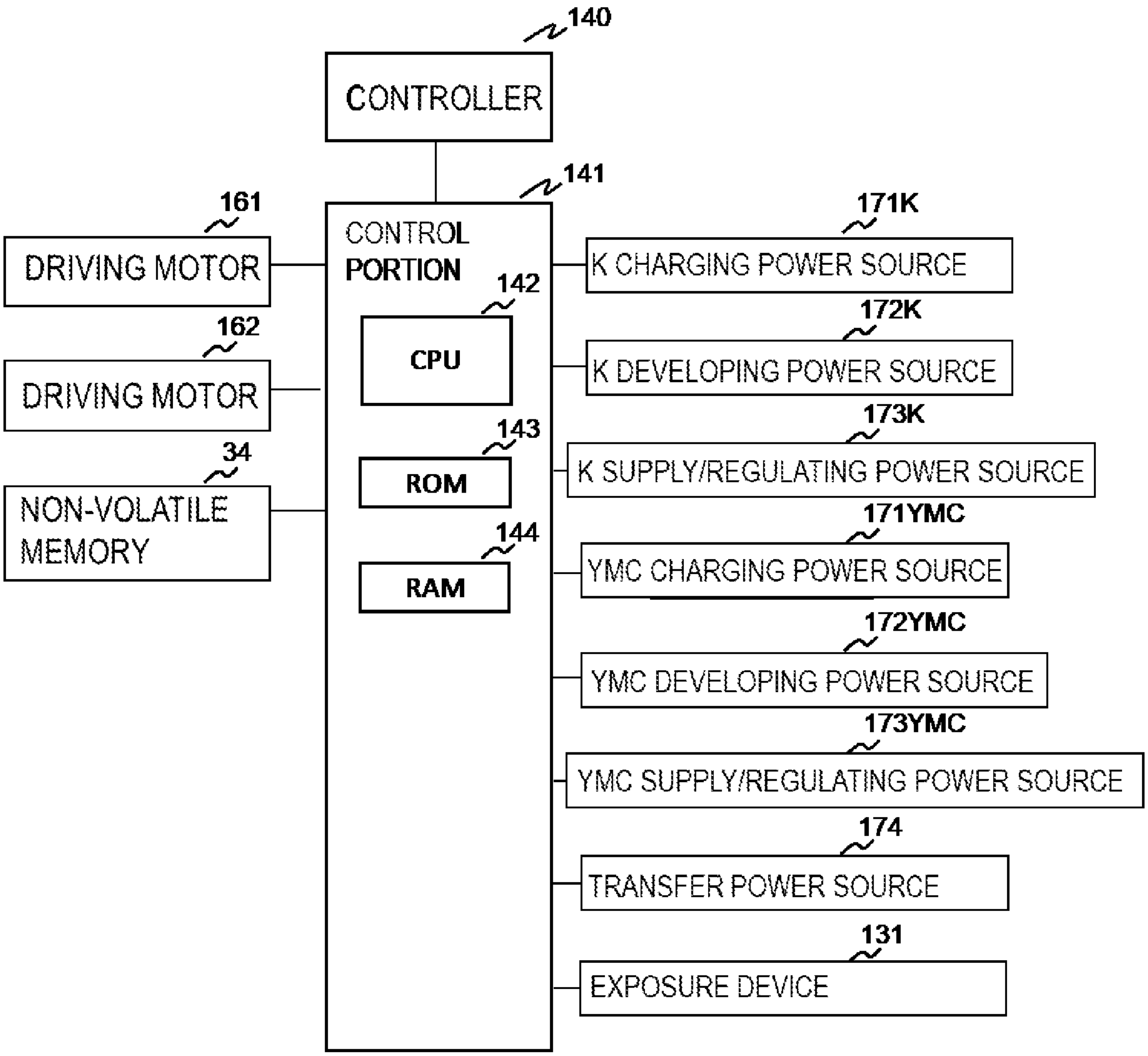
FIG. 12 is a conceptual diagram of the image forming apparatus driving system.

At the time of the full-color printing, image formation is executed at a timing appropriate for all the cartridges. The image forming apparatus 200 is roughly divided into a voltage supply system for PY, PM, and PC and a voltage supply system for PK. In other words, in regard to the voltages to be supplied to 1Y, 1M, and 1C, the same voltage is supplied thereto at the same timing (FIG. 12).

It is possible to use modified machines of existing laser printers for both the monochrome machine and the color machine as long as the voltages to be applied to the supply rollers, the regulating members, and the developing rollers of the process cartridges can be modified such that the same supply power source is used therefor or voltages are independently applied thereto in accordance with the process cartridges to be used.

Example 1

First, the image forming apparatus 100 that was a monochrome machine was prepared as an electrophotographic apparatus.

Next, a process cartridge filled with the toner 1 as a cartridge for the image forming apparatus 100 and the electrophotographic apparatus were left in an environment at an ordinary temperature and an ordinary humidity (25° C./50% RH) for 48 hours for the purpose of accustoming them to a measurement environment. Thereafter, evaluation which will be described later was carried out.

Examples 2 to 23 and Comparative Examples 1 to 6

Combinations of the toners, cartridges, and the image forming apparatuses described in Tables 6-1 and 6-2 were evaluated similarly to Example 1.

Note that the image forming apparatus 200 was used as the image forming apparatus serving as a color machine in Example 23 and the image forming apparatus 100' in which all the voltages to be applied to the supply roller, the regulating member, and the developing roller are independent was used as the image forming apparatus in Comparative Example 6.

Evaluation of Developing Ghost

A configuration as in FIG. 5 was employed in a case where the cartridge 1 was used in the image forming apparatus left in the above environment, and a setting voltage of the supply/regulating power source was set to have a potential difference of −100 V with respect to the voltage to be applied to the developing roller.

In a case where the cartridge 2 was used, the setting used for the cartridge 1 was used as it was for the setting voltage of the supply/regulating power source, and a resistor was inserted as in FIG. 8 thereby to set a potential difference of −100 V with respect to the voltage to be applied to the developing roller.

In a case where the cartridge 3 was used, a configuration as in FIG. 10 was employed, the setting voltage for the supply power source was set to have a potential difference of −100 V with respect to the voltage to be applied to the developing roller, and the setting voltage for the regulating power source was set to have a potential difference of −80 V with respect to the voltage to be applied to the developing roller.

With the above setting, a plurality of solid images of 10 mm×10 mm were formed in the first half of a transfer sheet, and a half-tone image of two dots and three spaces was formed in the second half thereof. How much the trace of the solid image appeared on the half-tone image was visually checked, and ranks A to C were determined to be satisfactory.

Evaluation results are shown in Table 6-2.

A: Developing ghost did not occur.

B: Developing ghost very slightly occurred.

C: Developing ghost slightly occurred.

D: Developing ghost significantly occurred.

Evaluation of Fogging on Photosensitive Drum

Measurement of fogging on the photosensitive drum was performed by using a REFLECTMETER MODEL TC-6DS manufactured by Tokyo Denshoku Co., Ltd. A green filter was used as a filter.

In a case where the cartridge 1 was used in the image forming apparatus left in the above environment, the configuration as in FIG. 5 was employed, and the setting voltage for the supply/regulating power source was set to have a potential difference of −100 V with respect to the voltage to be applied to the developing roller.

In a case where the cartridge 2 was used, the setting used in the cartridge 1 was used as it was for the setting voltage of the supply/regulating power source, and a resistor was inserted as in FIG. 8 thereby to set a potential difference of −100 V with respect to the voltage to be applied to the developing roller.

In a case where the cartridge 3 was used, the configuration as in FIG. 10 was employed, the setting voltage for the supply power source was set to have a potential difference of −100 V with respect to the voltage to be applied to the developing roller, and the setting voltage for the regulating power source was set to have a potential difference of −80 V with respect to the voltage to be applied to the developing roller.

In the above setting, reflectance of a white image immediately after an output of a solid black image that was obtained by taping the photosensitive drum with a mylar tape and attaching the mylar tape on the sheet was measured. Fogging on the photosensitive drum (%) was calculated by subtracting the reflectance of the mylar tape attached directly to the sheet from the reflectance and was evaluated by the following criterion.

Fogging on the photosensitive drum (reflectance) (%)=the reflectance of the tape with which the drum was taped (%)−the reflectance of the tape directly attached to the sheet (%)

Ranks A to C were determined to be satisfactory.

Evaluation results are shown in Table 6-2.

A: The proportion of fogging on the photosensitive drum was less than 0.4%.

B: The proportion of fogging on the photosensitive drum was equal to or greater than 0.4% and less than 0.7%.

C: The proportion of fogging on the photosensitive drum was equal to or greater than 0.7% and less than 1.0%.

D: The proportion of fogging on the photosensitive drum was equal to or greater than 1.0%.

Amount of Change in Fogging on Photosensitive Drum on Assumption of Variations in Outputs from Power Source Voltages Since fogging on the photosensitive drum was likely to occur in a case where the voltage to be applied to the supply electrode was raised due to variations in outputs of power source voltages as described above, whether the amount of fogging on the photosensitive drum was changed on the assumption of a case where variations in outputs of power source voltages occurred was checked.

In a case where the cartridge 1 was used for the image forming apparatus left in the above environment, fogging was measured by the same calculation method as that for fogging on the photosensitive drum in the setting in each of a case where the setting voltage of the supply/regulating power source was set to have a potential difference of −120 V with respect to the voltage to be applied to the developing roller and a case where the setting voltage of the supply/regulating power source was set to have a potential difference of −80 V, and an average value thereof was calculated as fogging on the photosensitive drum (%) in a case where there were variations in power source voltages.

In a case where the cartridge 2 was used, the setting used for the cartridge 1 was used as it was for the setting voltage of the supply/regulating power source, and a resistor was inserted as in FIG. 8 thereby to set a potential difference of −120 V or −80 V with respect to the voltage to be applied to the developing roller.

In a case where the cartridge 3 was used, the configuration as in FIG. 10 was employed, the setting voltage of the supply power source was set to have a potential difference of −120 V with respect to the voltage to be applied to the developing roller. Fogging was measured by the same calculation method as that for fogging on the photosensitive drum in setting in each of a case where the setting voltage for the regulating power source was set to have a potential difference of −100 V with respect to the voltage to be applied to the developing roller and a case where the setting voltage for the supply power source was set to have a potential difference of −100 V with respect to the voltage to be applied to the developing roller and the setting voltage for the regulating power source was set to have a potential difference of −80 V with respect to the voltage to be applied to the developing roller, and an average value thereof was calculated as fogging on the photosensitive drum (%) in a case where there were variations in power source voltages. In this manner, it was possible to evaluate the setting voltage of the supply power source as setting with which fogging on the photosensitive drum was disadvantageous due to variations in outputs of power source voltages.

The amount of change in fogging on the photosensitive drum (%) was calculated by using these values, and the result was evaluated by using the following criterion.

The amount of change in fogging on the photosensitive drum (%)=fogging on the photosensitive drum in a case where there are variations in outputs of power source voltages (%)−fogging on the photosensitive drum (%)

The ranks A and B were determined to be satisfactory.

The evaluation results are shown in Table 6-2.

A: The amount of change in fogging on the photosensitive drum is less than 0.2%.

B: The amount of change in fogging on the photosensitive drum is equal to or greater than 0.2% and less than 0.5%.

C: The amount of change in fogging on the photosensitive drum is equal to or greater than 0.5% and less than 0.7%.

D: The amount of change in fogging on the photosensitive drum is equal to or greater than 0.7%.

TABLE 6-1

| | Toner | Cartridge | Image forming apparatus |
|---|---|---|---|
| Example 1 | Toner 1 | Cartridge 1 | Monochrome machine |
| Example 2 | Toner 2 | Cartridge 1 | Monochrome machine |
| Example 3 | Toner 3 | Cartridge 1 | Monochrome machine |
| Example 4 | Toner 4 | Cartridge 1 | Monochrome machine |
| Example 5 | Toner 5 | Cartridge 1 | Monochrome machine |

TABLE 6-1-continued

| | Toner | Cartridge | Image forming apparatus |
|---|---|---|---|
| Example 6 | Toner 6 | Cartridge 1 | Monochrome machine |
| Example 7 | Toner 7 | Cartridge 1 | Monochrome machine |
| Example 8 | Toner 8 | Cartridge 1 | Monochrome machine |
| Example 9 | Toner 9 | Cartridge 1 | Monochrome machine |
| Example 10 | Toner 10 | Cartridge 1 | Monochrome machine |
| Example 11 | Toner 11 | Cartridge 1 | Monochrome machine |
| Example 12 | Toner 12 | Cartridge 1 | Monochrome machine |
| Example 13 | Toner 13 | Cartridge 1 | Monochrome machine |
| Example 14 | Toner 14 | Cartridge 1 | Monochrome machine |
| Example 15 | Toner 15 | Cartridge 1 | Monochrome machine |
| Example 16 | Toner 16 | Cartridge 1 | Monochrome machine |
| Example 17 | Toner 17 | Cartridge 1 | Monochrome machine |
| Example 18 | Toner 18 | Cartridge 1 | Monochrome machine |
| Example 19 | Toner 19 | Cartridge 1 | Monochrome machine |
| Example 20 | Toner 20 | Cartridge 1 | Monochrome machine |
| Example 21 | Toner 21 | Cartridge 1 | Monochrome machine |
| Example 22 | Toner 2 | Cartridge 2 | Monochrome machine |
| Example 23 | Toner 2 | Cartridge 1 | Color machine |
| Comparative example 1 | Toner 22 | Cartridge 1 | Monochrome machine |
| Comparative example 2 | Toner 23 | Cartridge 1 | Monochrome machine |
| Comparative example 3 | Toner 24 | Cartridge 1 | Monochrome machine |
| Comparative example 4 | Toner 25 | Cartridge 1 | Monochrome machine |
| Comparative example 5 | Toner 26 | Cartridge 1 | Monochrome machine |
| Comparative example 6 | Toner 2 | Cartridge 3 | Monochrome machine |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120557, filed Jul. 28, 2022 which is hereby incorporated by reference herein in its entirety.

What is claimed is:

1. A cartridge, comprising:

a toner;

a developing roller carrying on a surface thereof the toner;

a developer container rotatably supporting the developing roller;

a toner accommodating portion accommodating the toner;

a supply member abutting the surface of the developing roller and supplying the toner from the toner accommodating portion to the surface of the developing roller; and a regulating member abutting the surface of the developing roller and regulating the toner carried on the surface of the developing roller, wherein

TABLE 6-2

| | | Fogging on photosensitive drum | | Amount of change in fogging on photosensitive drum | | | |
|---|---|---|---|---|---|---|---|
| | Developing ghost evaluation | Amount of fogging [%] | Evaluation | Amount of fogging with potential difference of ~120 V [%] | Amount of fogging with potential difference of ~80 V [%] | Average value of amount of change in fogging with each potential difference [%] | Evaluation |
| Example 1 | A | 0.1 | A | 0.1 | 0.1 | 0.0 | A |
| Example 2 | A | 0.1 | A | 0.1 | 0.1 | 0.0 | A |
| Example 3 | B | 0.5 | B | 0.8 | 0.7 | 0.3 | B |
| Example 4 | B | 0.5 | B | 0.8 | 0.8 | 0.3 | B |
| Example 5 | A | 0.3 | A | 0.5 | 0.4 | 0.2 | B |
| Example 6 | B | 0.1 | A | 0.2 | 0.2 | 0.1 | A |
| Example 7 | A | 0.1 | A | 0.1 | 0.1 | 0.0 | A |
| Example 8 | A | 0.5 | B | 0.7 | 0.7 | 0.2 | B |
| Example 9 | A | 0.8 | C | 1.2 | 1.2 | 0.4 | B |
| Example 10 | A | 0.6 | B | 0.9 | 0.9 | 0.3 | B |
| Example 11 | B | 0.5 | B | 0.7 | 0.6 | 0.2 | B |
| Example 12 | C | 0.6 | B | 0.9 | 0.9 | 0.3 | B |
| Example 13 | C | 0.4 | B | 0.7 | 0.7 | 0.3 | B |
| Example 14 | B | 0.6 | B | 0.8 | 0.7 | 0.2 | B |
| Example 15 | A | 0.5 | B | 0.8 | 0.8 | 0.3 | B |
| Example 16 | A | 0.8 | C | 1.2 | 1.1 | 0.4 | B |
| Example 17 | A | 0.3 | A | 0.4 | 0.3 | 0.1 | A |
| Example 18 | A | 0.3 | A | 0.4 | 0.4 | 0.1 | A |
| Example 19 | B | 0.6 | B | 0.8 | 0.8 | 0.2 | B |
| Example 20 | C | 0.6 | B | 0.9 | 0.9 | 0.3 | B |
| Example 21 | A | 0.3 | A | 0.3 | 0.3 | 0.0 | A |
| Example 22 | C | 0.3 | A | 0.7 | 0.6 | 0.4 | B |
| Example 23 | A | 0.1 | A | 0.1 | 0.1 | 0.0 | A |
| Comparative example 1 | D | 1.2 | D | 1.8 | 1.7 | 0.6 | C |
| Comparative example 2 | D | 0.4 | B | 0.7 | 0.7 | 0.3 | B |
| Comparative example 3 | A | 1.8 | D | 2.1 | 2.0 | 0.3 | B |
| Comparative example 4 | D | 1.0 | D | 1.6 | 1.5 | 0.6 | C |
| Comparative example 5 | D | 1.2 | D | 1.8 | 1.8 | 0.6 | C |
| Comparative example 6 | A | 2.2 | D | 3.0 | 2.9 | 0.8 | D |

the cartridge comprises a first supply electrode to which a voltage is supplied from outside of the cartridge, the supply member and the regulating member are electrically connected to the same first supply electrode, the toner comprises a compound A having a structure represented by Formula (1) below, $$-(CH_2CH_2O)- \quad (1)$$

the compound A is eluted in methanol when elution treatment of the toner is carried out under an elution condition A below, and in a case where a supernatant obtained by centrifuging an eluate of the compound A eluted in the methanol under a centrifugation condition A below is analyzed within a range of m/z=50 to 1500 by liquid chromatograph ESI/MS, a reference peak defied as follows is present, and an average m/z defined as follows is 300 to 1000:

Elution condition A: Methanol (a product equivalent to JIS K8891) in an amount of ten times that of the toner by mass is used, and a mixture thereof is stirred at 25° C. at a rotor rotation speed of 200 rpm for 10 hours with a stirring apparatus;

Centrifugation condition A: Rotation is performed with a rotation radius of 10.1 cm and a rotation speed of 3500 rpm at 25° C. for 30 minutes;

Reference peak: A relative abundance is obtained on the assumption that an abundance of a peak of a highest strength in a mass analysis spectrum obtained by liquid chromatograph ESI/MS of the supernatant is 100%; peaks are chosen in a descending order of relative abundance, and a m/z value of a peak top of the chosen peak is defined as P; and a chosen peak with a highest relative abundance is defined as the reference peak from among the chosen peaks including peaks with a relative abundance of not less than 10% and with m/z values of P +44 or P −44 at peak tops;

Average m/z: The m/z value at the peak top of the reference peak is defined as Ps, the m/z value at the peak top=Ps+44n (n is an integer), and an average value of m/z at peak tops of peaks with a relative abundance of not less than 30% is defined as an average m/z.

2. The cartridge according to claim 1, wherein the toner is a negatively charged toner, and when the supernatant is supplied to a liquid chromatograph ESI/MS analysis device and is analyzed under an analysis condition A below, the compound A comprised in the supernatant is detected in an ionized form as a cation:

Analysis condition A: Under conditions of Sheath gas: 10 (arb. unit.), Aux gas: 5 (arb. unit.), spray voltage: 5 kV, and capillary temperature: 275° C., a compound ionized under conditions of capillary voltage: 35 V and tube lens voltage: 110 V is detected as a cation, and a compound ionized under conditions of capillary voltage: −35 V and tube lens voltage: −110 V is detected as an anion.

3. The cartridge according to claim 1, wherein the toner comprises a compound B eluted in methanol when elution treatment is carried out on the toner under the elution condition A, and when the supernatant is supplied to a liquid chromatograph ESI/MS analysis device and is analyzed under an analysis condition A below, the compound B comprised in the supernatant is detected in an ionized form as anion:

Analysis condition A: Under conditions of Sheath gas: 10 (arb. unit.), Aux gas: 5 (arb. unit.), spray voltage: 5 kV, and capillary temperature: 275° C., a compound ionized under conditions of capillary voltage: 35 V and tube lens voltage: 110 V is detected as a cation, and a compound ionized under conditions of capillary voltage: −35 V and tube lens voltage: −110 V is detected as anion.

4. The cartridge according to claim 3, wherein a peak is detected at m/z=325 in a case where the supernatant is analyzed by a liquid chromatograph ESI/MS analysis device, and a peak is detected at m/z=183 or m/z=197 in a case where the peak detected at m/z=325 is analyzed by a tandem mass spectrometer directly connected to the liquid chromatography ESI/MS analysis device under analysis conditions B:

Analysis condition B: Under conditions of Sheath gas: 10 (arb. unit.), Aux gas: 5 (arb. unit.), spray voltage: 5 kV, and capillary temperature: 275° C., a compound ionized under conditions of capillary voltage: −35 V and tube lens voltage: −110 V is detected as anion, and an ion detected at m/z=325 is selected as precursor ion, and an ion obtained by causing collision-induced dissociation with an inert gas: He at a collision energy: 35 eV is detected.

5. The cartridge according to claim 3, wherein in the analysis of the supernatant under the analysis condition A, a value of ratio P/N of a peak area P of a cation containing the compound A with respect to a peak area N of anion containing the compound B, calculated from a chromatogram analyzed under analysis conditions C below, is 0.20 to 2.00:

Analysis condition C: When 10 μL of solution is poured into an apparatus configuration using methanol in a mobile phase and not using any stationary phase at a flow rate of 1 ml/min, a range of m/z=50 to 1500 is analyzed by setting an acquisition time to 5 min and using a UV detector as a detector, and chromatogram is acquired.

6. The cartridge according to claim 1, wherein a content proportion of the structure represented by Formula (1) comprised in the compound A, with reference to the mass of the toner, is 50 to 1500 ppm by mass.

7. The cartridge according to claim 1, wherein the toner comprises a toner particle and an external additive on a surface of the toner particle, and a surface exposure rate of the toner particle is not less than 50% by area.

8. The cartridge according to claim 1, wherein the toner is a non-magnetic toner.

9. The cartridge according to claim 1, further comprising an electric element between the first supply electrode and the supply member.

10. The cartridge according to claim 1, further comprising an electric element between the first supply electrode and the regulating member.

11. The cartridge according to claim 1, wherein the cartridge comprises a second supply electrode which is different from the first supply electrode, a voltage being supplied from outside of the cartridge to the second supply electrode, the cartridge further comprising an electric element between the second supply electrode and the developing roller.

12. The cartridge according to claim 11, wherein the developing roller is not electrically connected to the supply member and the regulating member, and the developing roller is electrically connected to the second supply electrode.

13. The cartridge according to claim 1, further comprising a photosensitive drum being an image bearing member and a charging member charging a surface of the photosensitive drum.

14. The cartridge according to claim 13, wherein the toner remaining on the surface of the photosensitive drum is collected by the developing roller after the toner developed on the surface of the photosensitive drum is transferred to outside.

15. The cartridge according to claim 13, wherein in a case where the photosensitive drum is rotated, a region of the photosensitive drum, where a developing portion in which the photosensitive drum and the developing roller come into contact with each other is formed, does not come into contact with a contact member at a time during which the region of the photosensitive drum moves to a charging portion, where the photosensitive drum and the charging member come into contact with each other.

16. The cartridge according to claim 15, wherein the contact member is a cleaning member cleaning the surface of the photosensitive drum.

17. An image forming apparatus comprising:

the cartridge according to claim 1, wherein the same voltage is applied to the supply member and the regulating member via the first supply electrode.

* * * * *